US007206651B2

(12) United States Patent
Takemura et al.

(10) Patent No.: US 7,206,651 B2
(45) Date of Patent: Apr. 17, 2007

(54) METHOD OF DISPLAYING AND EDITING MIXER CONFIGURATION BY MIXER ENGINE CONTROL PROGRAM

(75) Inventors: Satoshi Takemura, Hamamatsu (JP); Mitsutaka Goto, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 20 days.

(21) Appl. No.: 11/234,749

(22) Filed: Sep. 23, 2005

(65) Prior Publication Data

US 2006/0079968 A1 Apr. 13, 2006

(30) Foreign Application Priority Data

Sep. 27, 2004 (JP) ............................. 2004-279192

(51) Int. Cl.
*G06F 17/00* (2006.01)
*H04B 1/00* (2006.01)

(52) U.S. Cl. ........................................ 700/94; 381/119

(58) Field of Classification Search .................. 700/94, 700/17, 18, 83; 381/119, 80
See application file for complete search history.

(56) References Cited

U.S. PATENT DOCUMENTS

| | | | | |
|---|---|---|---|---|
| 4,275,268 | A * | 6/1981 | Takahashi et al. | 381/119 |
| 4,479,240 | A * | 10/1984 | McKinley, Jr. | 381/80 |
| 4,677,674 | A * | 6/1987 | Snyder | 381/58 |
| 4,879,751 | A * | 11/1989 | Franks et al. | 381/119 |
| 4,885,792 | A * | 12/1989 | Christensen et al. | 381/119 |
| 5,243,513 | A * | 9/1993 | Peters | 700/83 |
| 6,292,620 | B1 * | 9/2001 | Ohmori et al. | 386/55 |
| 6,430,355 | B1 * | 8/2002 | Nagasawa | 386/52 |
| 6,839,441 | B1 * | 1/2005 | Powers et al. | 381/119 |
| 2002/0156547 | A1 * | 10/2002 | Suyama et al. | 700/94 |
| 2002/0176690 | A1 * | 11/2002 | Nagasawa | 386/52 |
| 2004/0260416 | A1 * | 12/2004 | Kellom et al. | 700/94 |
| 2005/0254440 | A1 * | 11/2005 | Sorrell | 370/264 |

OTHER PUBLICATIONS

Digital Mixing Engine, DME 32 Owner's Manual, Yamaha Corporation, 2001, 305 pages.

* cited by examiner

*Primary Examiner*—Thomas Pham
(74) *Attorney, Agent, or Firm*—Morrison & Foerster LLP

(57) ABSTRACT

A mixer engine control program is executable by a computer for performing a method of displaying and editing a mixer configuration which specifies a mixing process of a signal processing apparatus. Logging on is made to the mixer engine control program with a user authority. Mixer configuration is read from a storage. The read mixer configuration is displayed and edited within a scope permitted by the user authority with which the mixer engine control program has been logged on. The edited mixer configuration is written back to the storage. The storage may store a protected mixer configuration created and supplied by a vendor, such that the mixer configuration created by the vendor is protected with a vendor authority higher than the user authority with which the user is able to log on the mixer engine control program. When the mixer configuration protected with the vendor authority is supplied, the supplied mixer configuration is protected against displaying and editing of the mixer configuration if the mixer engine control program has been logged on with the user authority.

16 Claims, 14 Drawing Sheets

CUSTOM COMPONENT DATA

STORED CONFIG DATA

METHOD OF DISPLAYING AND EDITING MIXER CONFIGURATION BY MIXER ENGINE CONTROL PROGRAM

BACKGROUND OF THE INVENTION

1. Technical Field

The present invention relates to a control method and an application program for controlling a digital mixer engine which processes an audio signal.

2. Related Art

A digital mixer is known that may be customized in mixer configuration as described in non patent document "DIGITAL MIXING ENGINE DME32 INSTRUCTION MANUAL", YAMAHA CORPORATION, 2001. With this digital mixer, its sound signal processing block is configured by a processor (a digital signal processor (DSP) for example) that is operational as instructed by programs so as to process sound signals on the basis of a mixer configuration (or a signal processing configuration) created and edited by use of an external PC (Personal Computer). The mixer configuration creating and editing operations on the PC are executed by use of a dedicated mixer control program. To be more specific, the mixer control program is operated on the PC to display a mixer editing screen. On the screen, components (or configuration elements) providing parts for signal processing are arranged, and the arranged components are interconnected to specify input/output relationships, thereby creating and editing a desired mixer configuration. The created mixer configuration is transmitted to the digital mixer for execution, thereby allowing the digital mixer to realize an operation of the created mixer configuration.

The above-mentioned components include a preset component (hereafter referred to as a P component) and a custom component (hereafter referred to as a C component). The P component provides a basic unit of mixer configuration components. The C component is a combination of a plurality of P components. The C component may be created and edited as desired by a user given a predetermined authority.

A mixer control program allows the definition of a user authority of each user who uses that mixer control program and the definition of a setting scope in which a mixer configuration may be set for each user authority. Normally, a specific user name (for example, Administrator) of top administration authority is determined in advance, so that each user who purchased a mixer engine logs on the mixer control program with that user name for user registration and sets the user authority of each user as desired.

On the other hand, vendors are known that create and sell mixer configurations and parameters thereof. However, these mixer configurations and parameters are all seen through if a user gives the top user authority to his own user name, thereby making it difficult to protect these configurations and parameters as know-how. The same holds when a vendors creates and sells C components. Each user may see through the configurations and parameters of these C components as desired. Vendors sometimes want to hide the entirety of each configuration and the details of parameters of their products away from the user.

SUMMARY OF THE INVENTION

It is therefore an object of the present invention to provide a mixer control program for controlling digital mixers which process sound signals so as to protect the know-how of the mixer configurations and custom configuration components supplied by vendors.

In carrying out the invention and according to one aspect thereof, there is provided a mixer engine control program, executed by a computer, having capabilities of displaying and editing mixing configurations and custom components thereof, in which a vendor user authority is provided for allowing a privilege of accessing to vendor provided data separately from a user authority of a general user. In addition, A vendor identification code (hereinafter, vendor ID) is stored in each vendor provided mixer configuration and custom components. If a user who has logged on the mixer engine control program is a vendor user, the vendor ID of this logon user is compared with the vendor ID embedded in the mixer configuration or the custom component. If a match is found, that vendor user is allowed to display and edit the mixer configuration and the custom component. If the logon user is a general user, the displaying and editing of the vendor provided mixer configuration and custom component are not permitted. In this case, vendor protection contents may be also stored in each mixer configuration and custom component to limit the authority of each general user within a scope permitted by the vendor protection contents.

As described and according to the present invention, vendor provided data may be protected against general users in their attempt of displaying and editing the vendor provided data, thereby protecting the know-how contained in the vendor provided mixer configurations, custom components, and parameters. General users may use vendor provided mixer configurations and custom components as desired within a scope limited by the vendor authority. The limitation based on the vendor authority is substantially similar to that practiced by general users with administrator authority; therefore, general users having lower authorities than the administrator authority cannot notice the difference. Further, a plurality of vendors are identified with vendor IDs, so that know-how contained in the mixer configurations, custom components, and parameters provided by one vendor may be protected against other vendors.

DETAILED DESCRIPTION OF THE INVENTION

The following describes embodiments of the present invention with reference to accompanying drawings.

Figure 1:
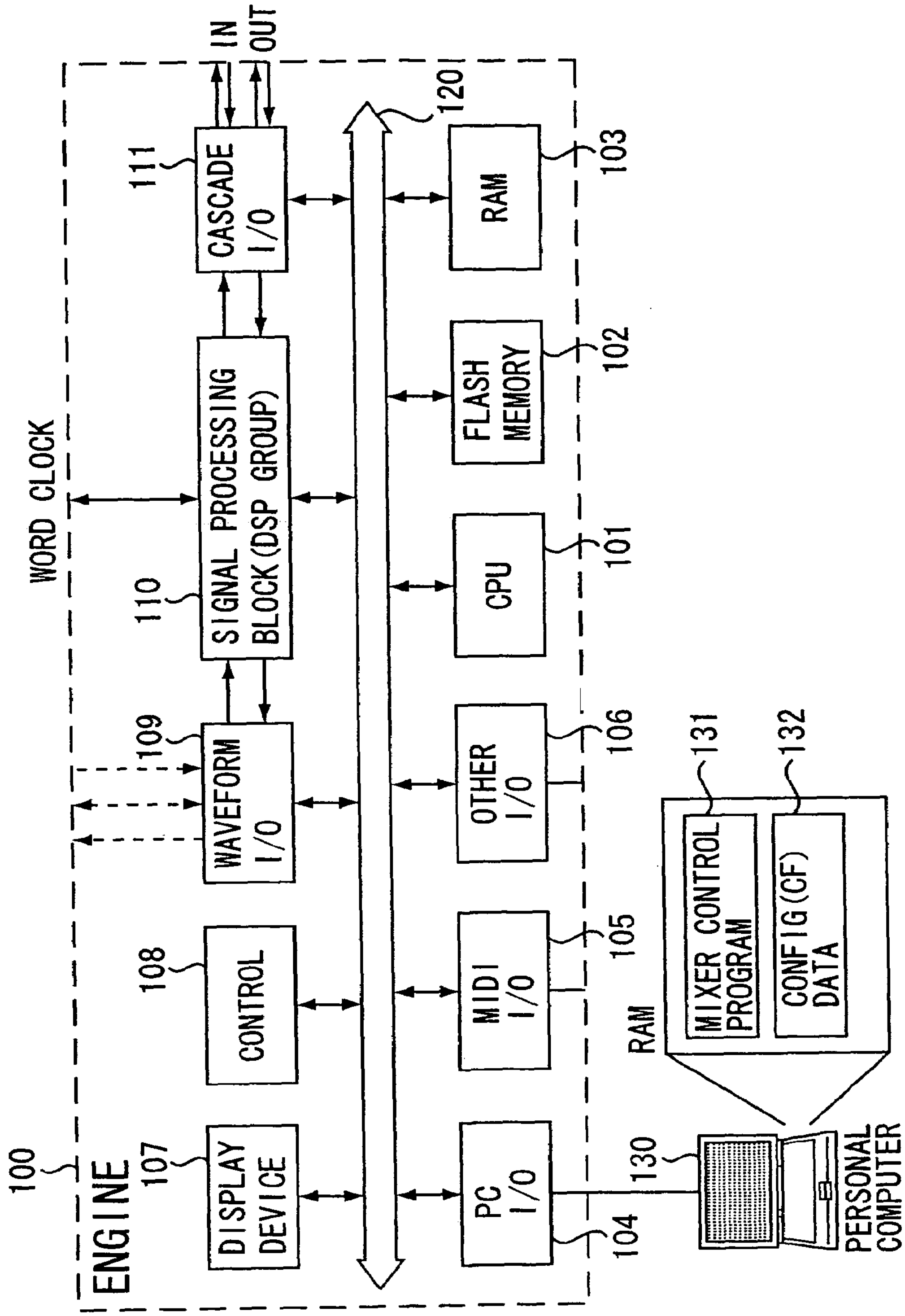
FIG. 1 is a configuration diagram illustrating an engine of a digital mixer practiced as one embodiment of the invention.

Now, referring to FIG. 1, there is shown an exemplary configuration of an engine of a digital mixer practiced as one embodiment of the invention. An engine 100 has a central processing unit (CPU) 101, a flash memory 102, a RAM (Random Access Memory) 103, a PC input/output interface (I/O) 104, a MIDI I/O 105, other I/O 106, a display device 107, a control 108, a waveform I/O 109, a signal processing block (DSP group) 110, a cascade I/O 111, and a system bus 120.

The central processing unit (CPU) 101 control the operations of the entire mixer. The flash memory 102 is a nonvolatile memory for storing various programs and data for use by the CPU 101 and DSP of the signal processing block 110. The RAM 103 is a volatile memory for use as a load area and a work area for programs that are executed by the CPU 101. The PC I/O 104 is an interface (for example, LAN, USB, or serial I/O) for connecting an external personal computer (hereafter referred to as a PC) 130. The MIDI I/O 105 is an interface for connecting various MIDI devices. The other I/O 106 is an interface for connecting other devices. The display device 107, arranged on an external panel of this mixer, displays various kinds of information. The control 108, arranged on the external panel, includes various kinds of controls for the user to operate. The waveform I/O 109 is an interface for passing sound signals with external devices; for example, the waveform I/O 109 realizes an A/D (Analog/Digital) conversion capability of converting an input analog sound signal into a digital sound signal and passing it to the signal processing block 110, a digital signal input capability of inputting a digital sound signal and passes it to the signal processing block 110, and a D/A (Digital/Analog) conversion capability of converting an input digital sound signal into an analog sound signal and outputs it to a sound system. The signal processing block 110 is composed of several DSPs (Digital Signal Processors) These DSPs execute various microprograms as instructed by the CPU 101, carries out mixing processing, effect imparting processing, and volume level control processing on a waveform signal inputted through the waveform I/O 109, and outputs the processed waveform signal through the waveform I/O 109. The cascade I/O 111 is an interface for cascading with another digital mixer. Cascading increases the number of I/O channels and the DSP processing capability.

The engine 100 of the present digital mixer allows the customization of a mixer configuration that is realized by the signal processing block 110. The mixer configuration may be created and edited on the screen of the PC 130 by a predetermined mixer control program 131 that operates on the PC 130. A created mixer program is called a configuration (the entity on the PC is CF data). The mixer control program 131 generates a configuration in the memory as config (CF) data 132 in accordance with an instruction given by the user on the screen. The CF data 132 may be stored in a given storage device as a file, the storage device being writable by the PC 130. The CF data in the memory or storage device of the side of the PC 130 may be transferred to the engine 100 after compilation (namely, converting the CF data into information readable by the engine 100). The engine 100 may store the CF data received from the PC 130 into the flash memory 102. By executing a predetermined operation by the user, the CF data stored in the flash memory 102 may be read into a current memory (to be described later) in the RAM 103 or the CF data transferred from the PC 130 may be directly developed into the current memory to operate the engine 100 on the basis of the CF data stored in the current memory, thereby realizing the mixer having the mixer configuration defined in this CF data.

To be more specific, the creation and editing of a mixer configuration by the mixer control program 131 are executed by arranging and interconnecting P (Preset) components and C (Custom) components on the mixer configuration screen of the PC 130. A P component is a basic unit part block for making up a configuration; for example, P components include an audio processor such as mixer, compressor, effect, and crossover and individual parts such as fader, switch, pan, and meter. A C (Custom) component is created and edited by he user and is made up of a plurality P components or C components. Interconnecting these components is equivalent to the definition of signal input/output relationships of components.

Figure 2A:
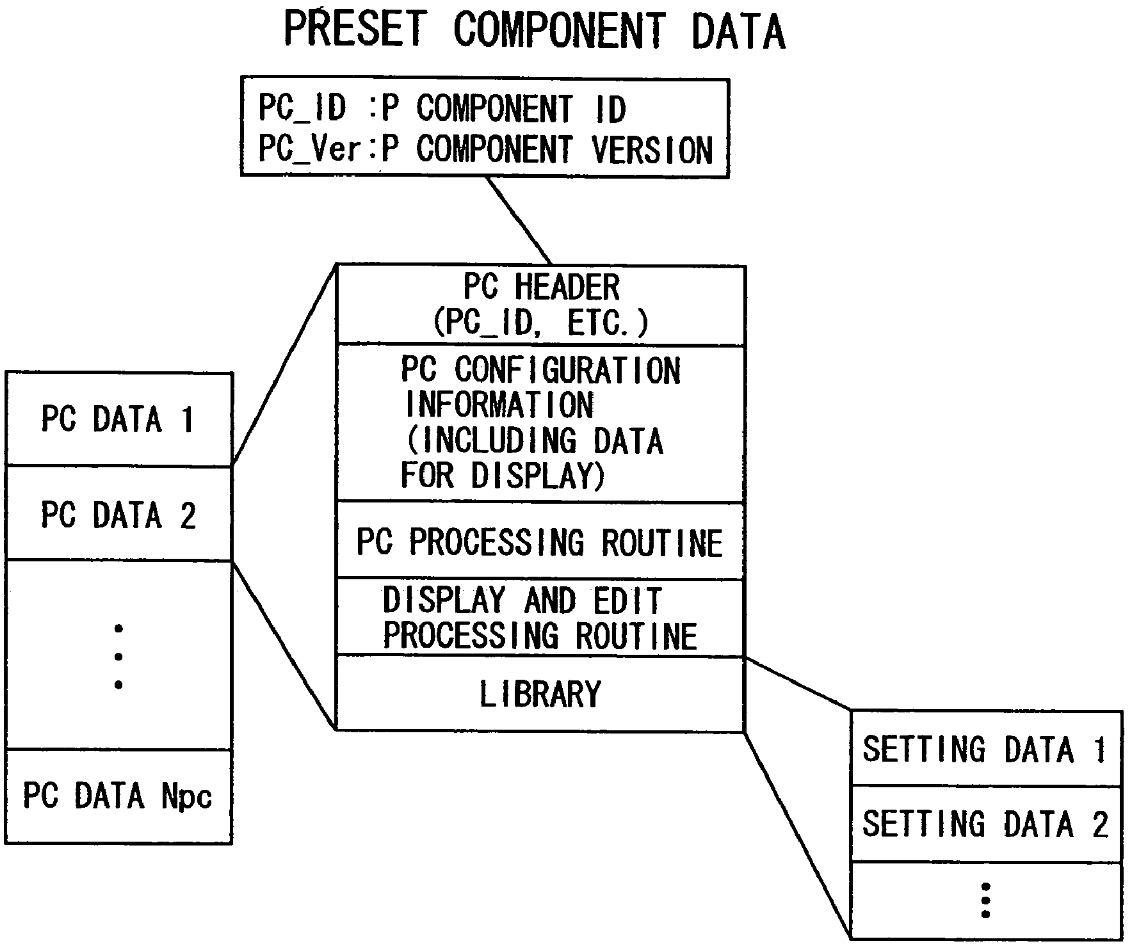
FIGS. 2(*a*), 2(*b*) and 2(*c*) are configuration diagrams illustrating component data and CF data for use by a mixer control program of a PC.
Figure 2B:
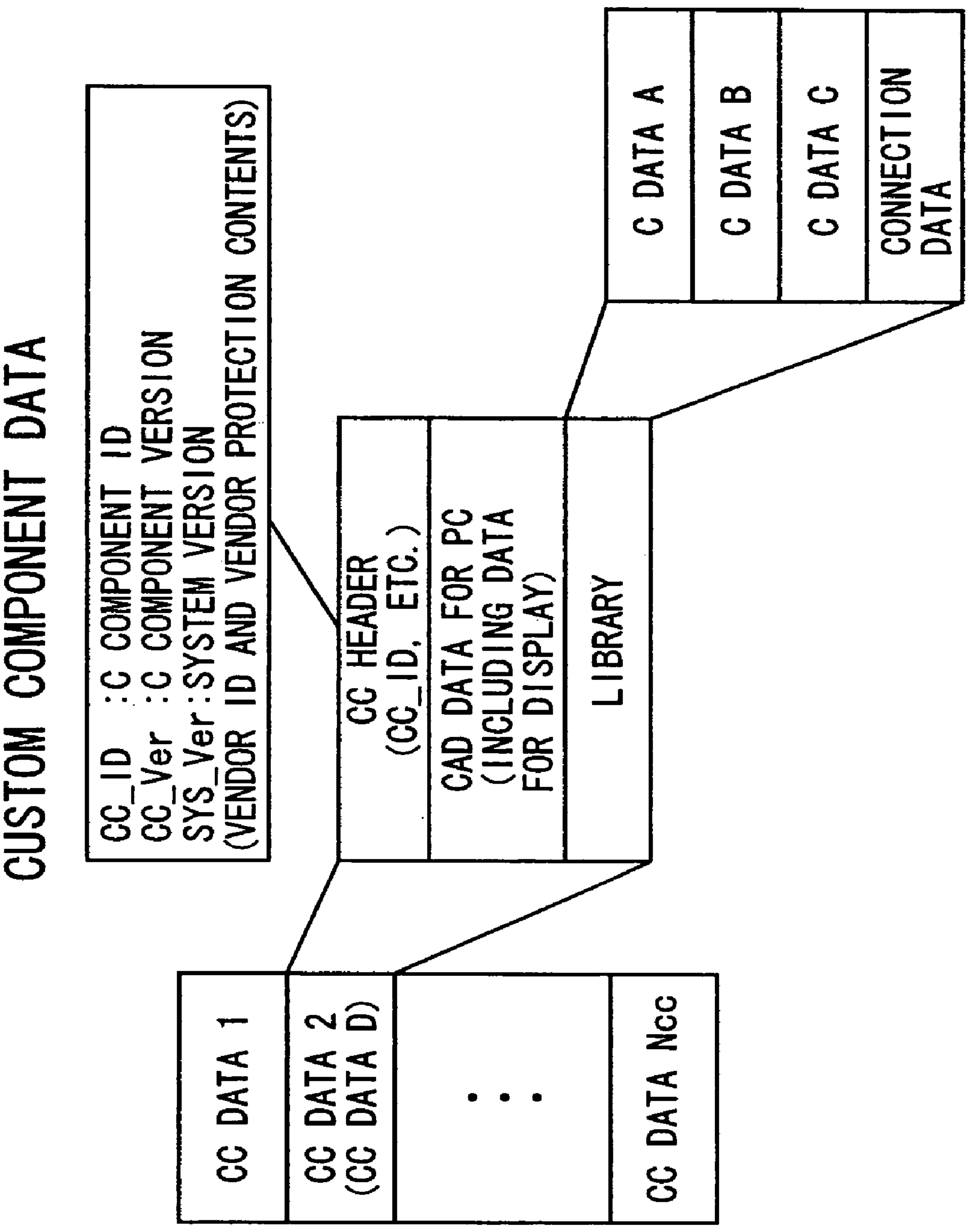
Figure 2C:
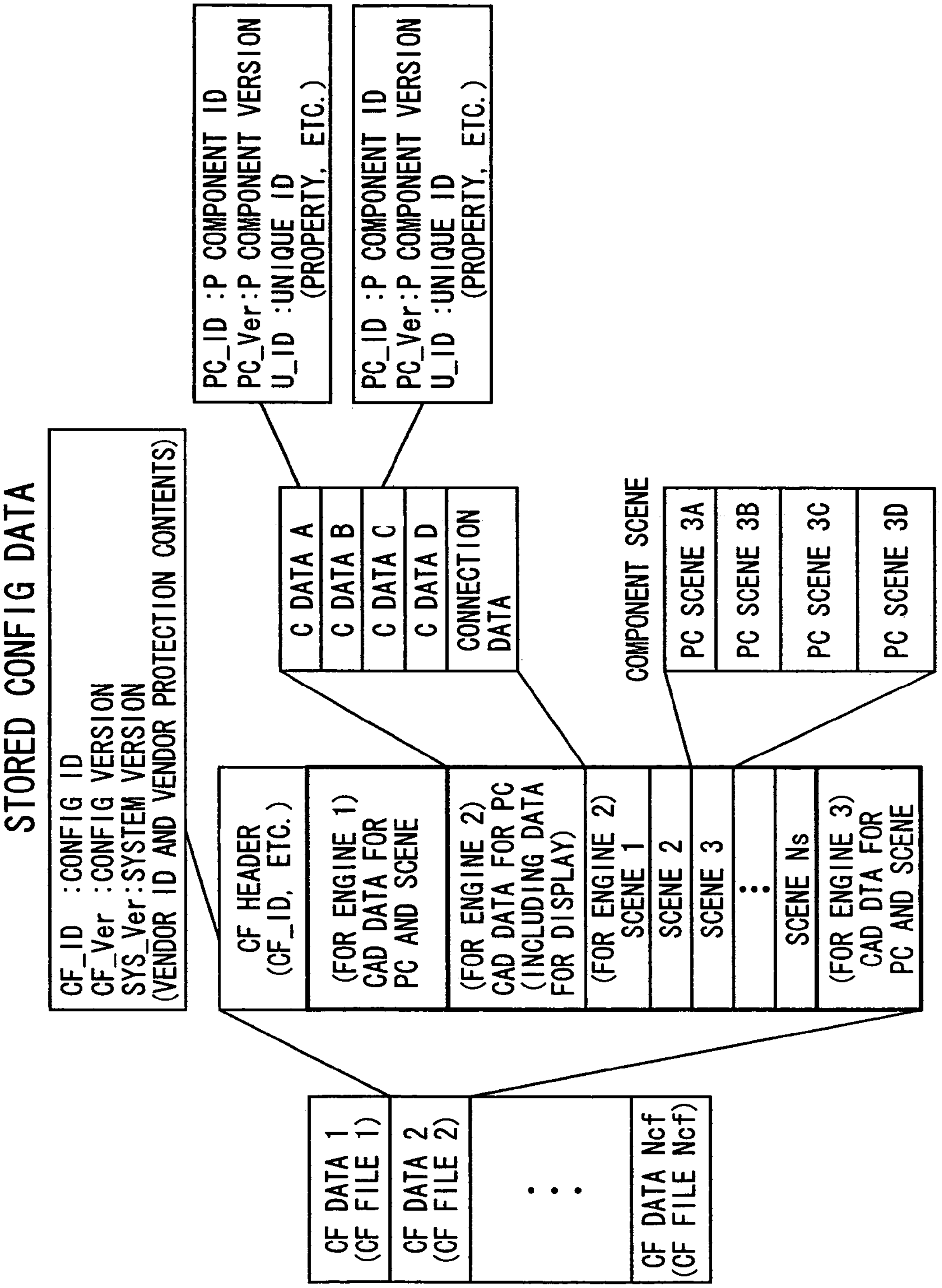

FIG. 2(*a*) shows a configuration of P component data (PC data) that is used by the mixer control program 131 of the PC 130. PC data is definition data for specifying a P component and stored beforehand in a given storage accessible by the mixer control program 131. PC data is prepared for each type of PC component. In this example, there are Npc pieces of PC data. One piece of PC data is made up of a PC header, PC configuration information, a PC processing routine, a display and edit processing routine, and a library. The PC header is made up of P component ID (PC_ID) and P component version (PC_Ver). PC_ID and PC_Ver may identify PC data. The PC configuration information is indicative of which component that P component is made up and includes data for displaying a control screen on which parameters for that P component are set. The PC routine is a program for executing various kinds of processing operations associated with PC configuration information. When the mixer control program 131 processes CF data, the PC processing routine for each component is used. The display and edit processing routine is a group of programs for use in creating and editing CF data. The library stores parameter settings for components in a predetermined patterns. When a P component is used as a component by calling onto a mixer configuration screen or a C component creation and editing screen, given setting data may be read from the library of the PC data of that P component for batch parameter setting.

FIG. 2(*b*) shows a configuration of C component data (CC data) that is used by the mixer control program 131 of the PC 130. CC data is definition data for specifying a C component. One piece of CC data is made up of a CC header, CAD data for PC, and a library. The CC header is made up of C component ID (CC_ID), C component version (CC_Ver), and system version (SYS_Ver). If that CC data is one created by a vendor (to be described later), the CC header stores vendor ID of that vendor and vendor protect contents (to be described later). CC_ID and CC_Ver may identify CC data. The CAD data for PC in the CC data defines how that component is configured with respect to the type of component and the type of connection. The CAD data for PC is made up of C data for specifying a P component and a C component and connection data for interconnecting these components. Also, the CAD data for PC in CC data includes data for displaying a C component configuration screen shown in FIG. 6 to be described later and a C component control screen shown in FIG. 4(*c*) to be described later. In addition, CC data may have a library. The library is used when a C component is called onto a mixer configuration screen or a C component creation and editing screen for use as a component by executing the parameter setting for that C component in a batch. The C component data such as described above may be created and edited by each user having a predetermined authority and stored in a predetermined storage device. If a vendor provides C component data, the CC data is built in the data shown in FIG. 2(*b*) in a predetermined installation procedure (for example, CC data file copy).

Figure 4A:
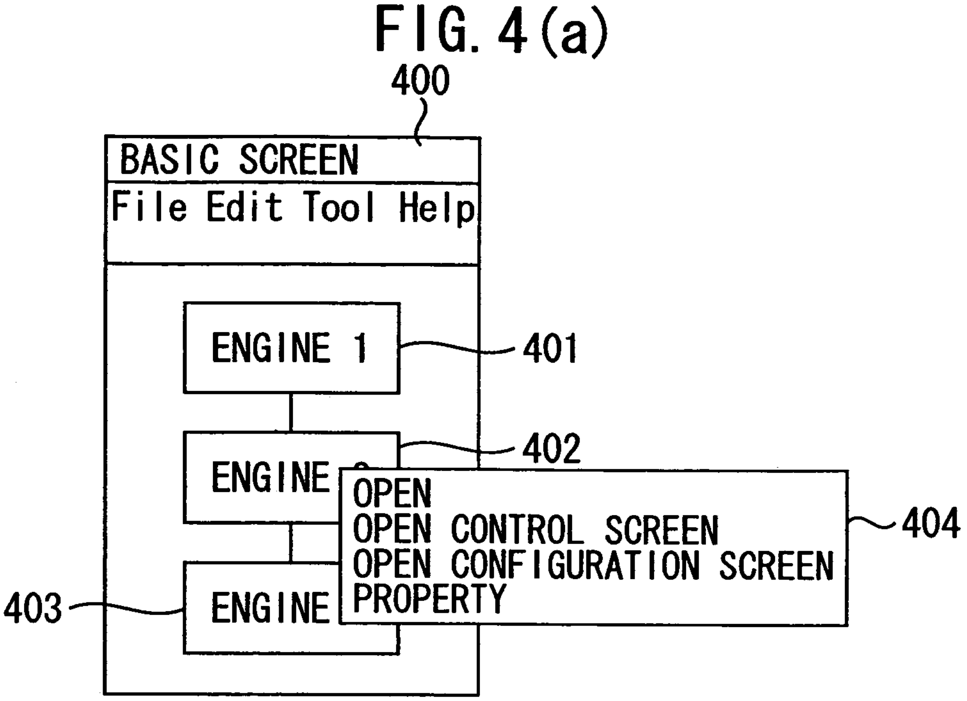
FIGS. 4(*a*), 4(*b*) and 4(*c*) are diagrams illustrating examples of a basic screen and a control screen presented on a display device of the PC.
Figure 4B:
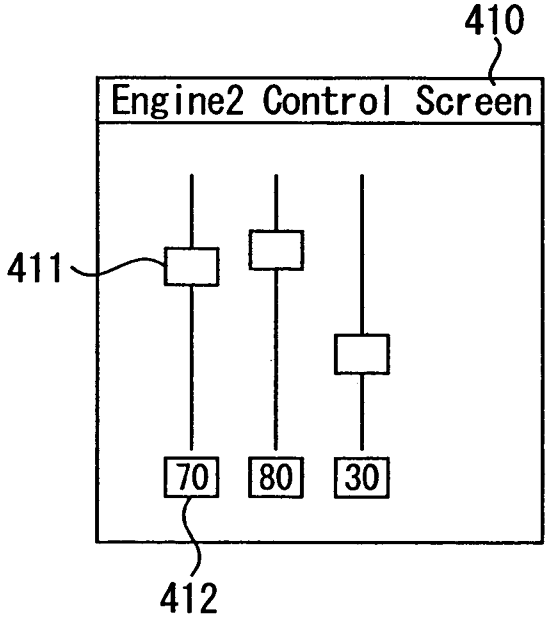
Figure 4C:
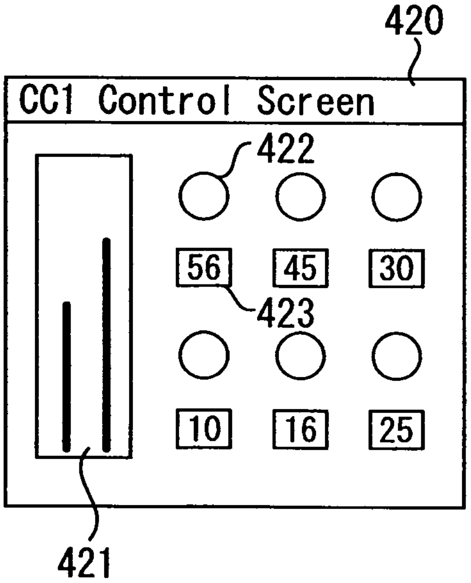

FIG. 2(*c*) shows a configuration of CF data created and stored by the mixer control program 131 in the PC 130. Each piece of CF data 1 through Ncf is CF data specifying one mixer configuration. Each piece of CF data may be stored in a given storage device (for example, a hard disk drive in the PC) as one file. One piece of CF data is made up of a CF header and CAD data for PC and scene data for one engine. In a configuration where a plurality of engines are connected, CAD data for PC and scene data are stored for each engine. The CAD data for PC and scene data for one engine are made up of CAD data for PC and Ns scene data as shown in the figure. In this example, three engines 1 through 3 are cascaded as shown in FIG. 4(*a*) as will be described later, so that the CAD data for PC and scene data of each engine are stored, details of the engine 2 being illustrated for example. The CF header of CF data is made up of config ID (CF_ID), config version (CF_Ver), and system version (SYS_Ver). If the CF data concerned has a mixer configuration created by a vendor (to be described later), the vendor ID of that vendor and vendor protection contents (i.e., vendor protection terms indicating usage restriction applied to general users, to be described later) are stored in the CF header. The CAD data for PC defines the mixer configuration of the CF data concerned with respect to the type of component and the type of connection and is made up of C data for specifying a P component and a C component to be used as components of that configuration and connection data for interconnecting these components. Also, CAD data for PC includes the display data for displaying a mixer configuration screen shown in FIG. 5 to be described later and a control screen shown in FIG. 4(*b*). The C data in CAD data for PC is made up of ID and version, unique ID (U_ID) and other data (for example, property) for specifying a P component or a C component. ID and version are P component ID (PC_ID) and P component version (PC_Ver) when a P component is specified and C component ID (CC_ID) and C component version (CC_Ver) when a C component is specified. The scene data is a data set of specific parameters for use when each component of the configuration concerned operates. Sometimes, a change of parameters in the same mixer configuration is desired depending on scenes, so that the scene data for a plurality of scenes may be included in one piece of CF data.

When the mixer control program 131 operates, the PC data shown in FIG. 2(*a*) and the CC data shown in FIG. 2(*b*) are loaded into the RAM of the PC 130 and, at the same time, a current memory area for storing data being edited is stored is provided in the RAM of the PC 130. When one of a plurality of pieces of CF data shown in FIG. 2(*c*) is selected by the user, the selected CF data is loaded into the current memory to provide current CF data. In the current memory, a current scene area is created having a data configuration corresponding to the CAD data for PC in the current CF data, thereby storing the current scene that is a data set of current parameter values subject to editing. When the CAD data for PC in the CF data stored in the current memory is edited in accordance with a user operation, the data configuration of the current scene area changes accordingly. In this process, the engine 100 is put in the offline state. Further, when the user gives an instruction to turn the engine 100 online after storage of the edited CF data into a CF file, the PC 130 compiles the CF data shown in FIG. 2(*c*) and transmits the compiled CF data to the engine 100, which stores the received CF data into the flash memory 102. In CF data compilation, if a C component is included in the CAD data for PC of that CF data, the C component is sequentially developed by use of the corresponding CC data, so that the complied CAD data includes no C component. By accepting a CF data selection instruction from the PC 130 and operating the control 108 on the panel by looking at a screen shown on the display device 107, the CF data stored in the flash memory 102 may be called into the current memory of the engine 100. Consequently, the engine 100 operates as a mixing having a mixer configuration that is defined in the CF data concerned.

Figure 3A:
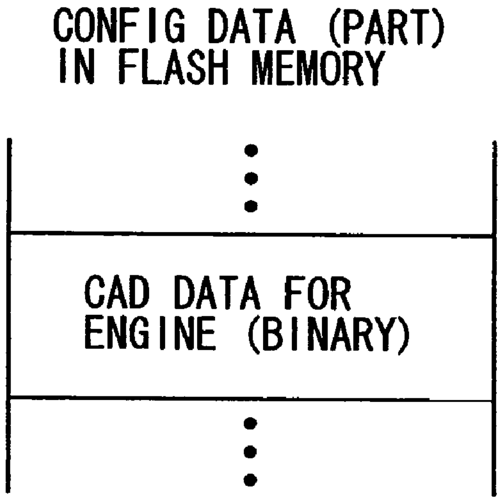
FIGS. 3(*a*), 3(*b*) and 3(*c*) are configuration diagrams illustrating CF data and so on to be stored in a flash memory of the engine.
Figure 3C:
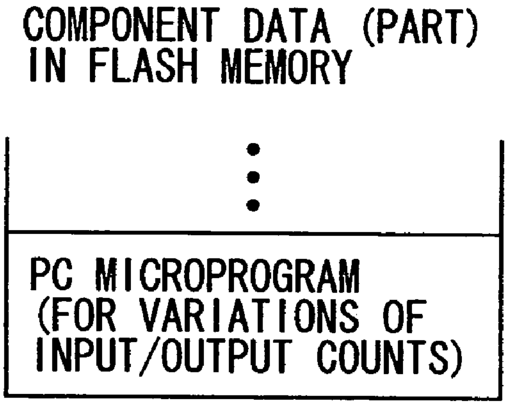
Figure 3B:
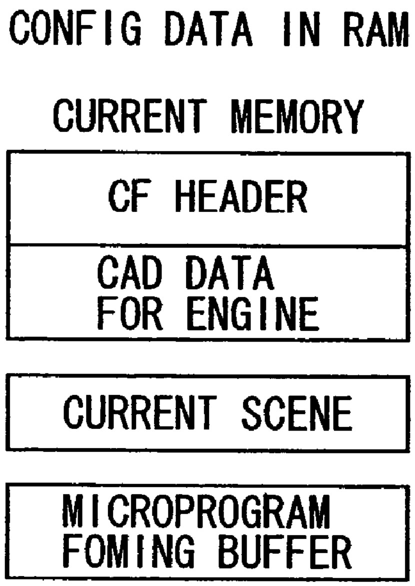

FIG. 3(*a*) shows a part of CF data that is stored in the flash memory 102 in the engine 100. The CF data stored in the flash memory 102 is almost the same in configuration as the CF data in the PC shown in FIG. 2(*c*). However, on the side of the engine 100, the CAD data for PC shown in FIG. 2(*c*) is replaced by the CAD data for engine shown in FIG. 3(*a*). The CAD data for engine is the same as the CAD data for PC in that both data are indicative of a mixer configuration; however, the display data for displaying a mixer configuration screen is not required in the engine, so that the CAD data for engine includes no display data and is represented in binary notation so as to save amounts of data. It should be noted that, because there is no C component concept on the side of the engine, the CAD data for engine is developed into C data that specifies bottom-layer PC data.

FIG. 3(*b*) shows a configuration of the CF data on the engine 100 in the RAM 103. The current memory in the RAM 103 has an area for storing a CD header and CAD data for engine of CF data, an area for storing a current scene that is the currently set scene data, and a microprogram forming buffer. When the CAD data for engine is loaded in the current memory, a microprogram for realizing a mixer configuration of the CAD data concerned is automatically developed in the microprogram forming buffer and the microprogram is transmitted to the signal processing block 110. Consequently, the DSP group of the signal processing block 110 realizes a CAD data mixer configuration operation in the current memory. Because reading from the flash memory is faster than from a storage device (a hard disk drive for example) of the PC, the scene recall speed will not slow down if a plurality of pieces of scene data are not read into the current memory. Also, the CAD data for engine need not always be read into the current memory and the data in the flash memory may be used directly.

A current scene is a current value of the parameter of each component of the mixer configuration of the CAD data for engine developed in the current memory. When a current scene is read into the current memory or the current scene in the current memory is changed, that current scene is automatically transmitted to the signal processing block 110. The signal processing block 110 develops the received current scene into a coefficient memory of the DSP group. By use of the coefficient memory, the DSP group of the signal processing block 110 executes the received microprogram described above, thereby realizing an operation with a mixer configuration of the CAD data in the current memory and with the current scene parameter value.

FIG. 3(*c*) shows a part of a configuration of P component data stored beforehand in the flash memory 102. This P component data is almost the same in configuration as the P component data in the PC shown in FIG. 2(*a*); however, on the side of the engine 100, the display and editing processing routine and the library shown in FIG. 2(*a*) are replaced by the PC microprogram shown in FIG. 3(*c*) Because each component in a mixer configuration screen and a control screen having a plurality of controls cannot be displayed in the engine 100, the display and editing routine for displaying these screens is not required. Also, no library is used on the engine side, the engine has no library. Instead, because the engine 100 requires the transmission of a microprogram (generated in the microprogram forming buffer) corresponding to a mixer configuration of CAD data for engine to the DSP group, a PC microprogram corresponding to each component as shown in FIG. 3(*c*) is required. Although not shown, a PC processing routine is made up of various programs that process configuration information in the engine. It should be noted that, because there is no C component concept on the side of the engine, the C component data as shown in FIG. 2(*b*) is not stored in the flash memory 102.

The following describes exemplary screens that are displayed when the mixer control program 131 operates in the mixer system of the present embodiment described above with reference to FIGS. 1 through 3.

FIG. 4(*a*) shows a basic screen 400 that is displayed first when the user properly logs in on the mixer control program 131 on the PC 130. The basic screen 400 shows an initial screen corresponding to the connection status of the engine 100. In this example, three engines 1 through 3 are cascaded, so that blocks 401 through 403 corresponding to these engines are displayed in the connected state. Reference numeral 404 denotes a menu that is displayed when the right-hand button of the mouse is clicked with the mouse cursor positioned at the block 402 indicative of the engine 2. By use of this right-hand-button click menu 404 or a menu on top of the basic screen 400, various processing operations associated with the mixer configuration of engines connected to the PC 130 are executed.

Figure 5:
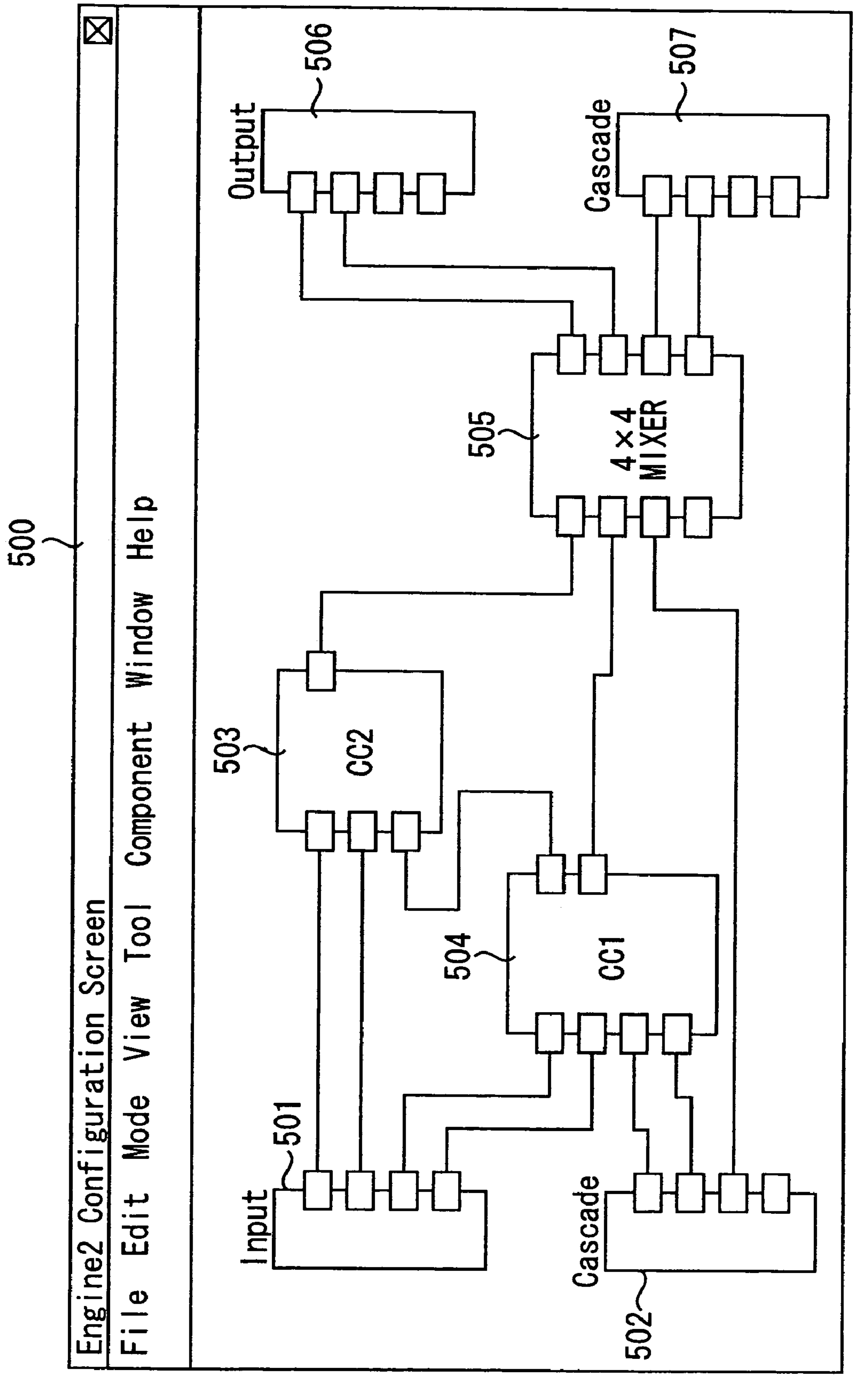
FIG. 5 is a diagram illustrating a configuration screen of the engine.

When "Open control menu" is selected from the right-hand-button click menu 404 a control screen 410 of the mixer configuration of the engine concerned as shown in FIG. 4(*b*) is displayed. When "Open configuration screen" is selected in the right-hand-button click menu 404, a mixer configuration screen 500 of the engine concerned as shown in FIG. 5 is displayed. When "Open" is selected by the right-hand-button click menu 404, one of the control screen and the mixer configuration screen is displayed. The selection between these screens is determined by "Property" in the right-hand-button click menu 404 in advance. It should be noted that the same operation specified in the right-hand-button click menu 404 may be executed by use of the menu on top of the basic screen 400. Double-clicking any one of the engine blocks 401 through 403 results in the same processing as selecting "Open" in the right-hand-button click menu 404.

The mixer configuration screen 500 shown in FIG. 5 is an exemplary screen showing a mixer configuration (or the CF data loaded in the current memory in the PC) currently set to the engine 2. On the mixer configuration screen 500, P components or C components are displayed on the basis of the CAD data for PC in the CF data stored in the current memory and interconnected with lines for specifying input/output relationships of these components. Reference numerals 501 and 506 are elements representative of the input and output terminals of the engine 2. Reference numerals 502 and 507 are elements representative of terminals for cascading engines. Reference numerals 503 and 504 are indicative of C components, while reference numeral 505 is indicative of a P component. These displayed C components and P component are identified by the C data of the CAD data for PC in the CF data stored in the current memory and correspond to the PC data shown in FIG. 2(*a*) and the CC data shown in FIG. 2(*b*). When an instruction is given for the storage of the mixer configuration under creation and editing on the mixer configuration screen, the CF data stored in the current memory representative of the mixer configuration displayed at that moment may be stored in a give storage with the CF file format described with reference to FIG. 2(*c*) and the specified file name. Conversely, when the CF file having the format shown in FIG. 2(*c*) stored in a given storage is opened, the CF data is read into the current memory, thereby displaying the mixer configuration screen corresponding to the CF data for the execution of editing.

Figure 6:
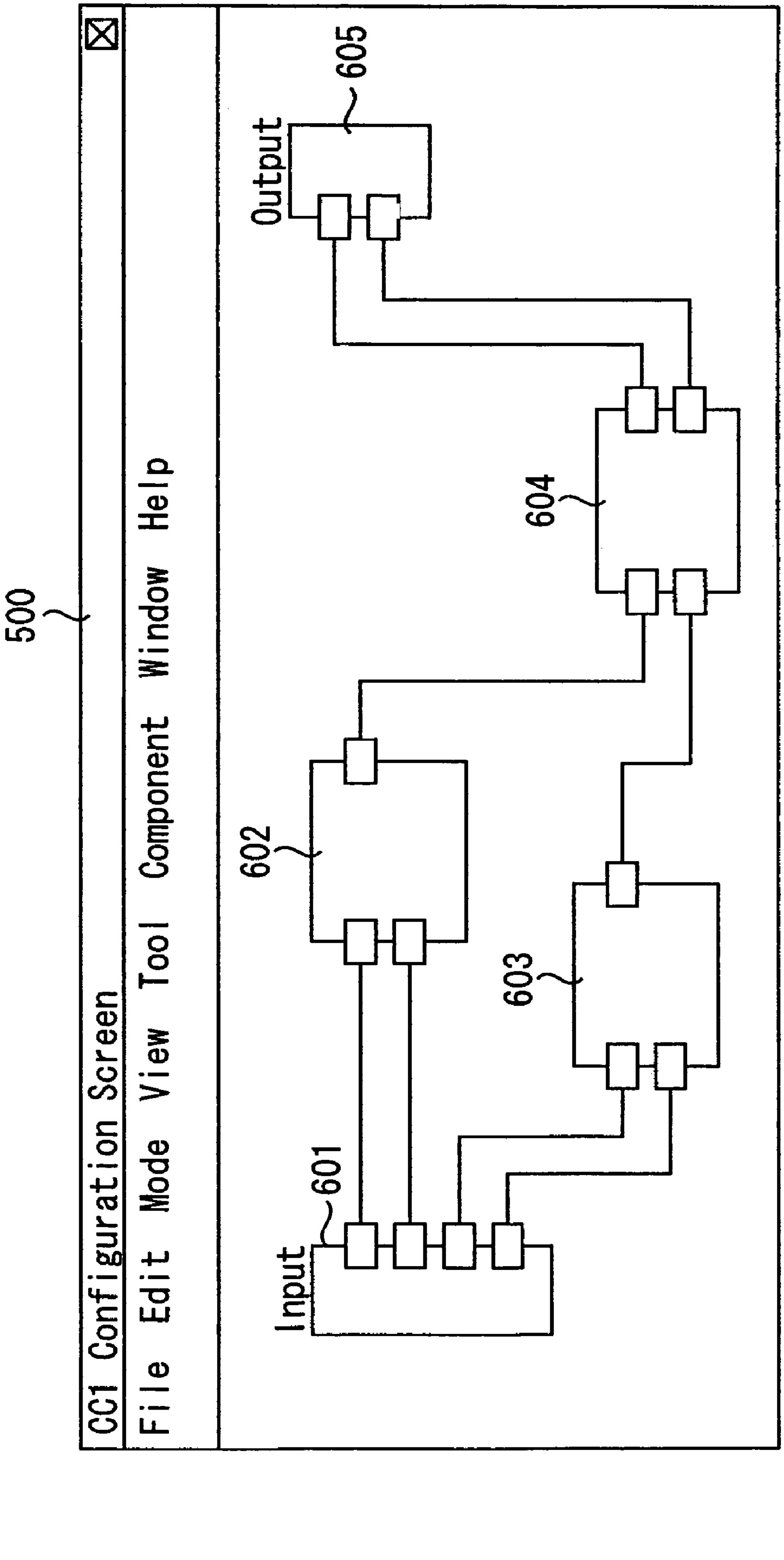
FIG. 6 is a diagram illustrating a configuration screen of a C component.

When elements 504 or 505 representative of C component is clicked with the right-hand button of the mouse, a right-hand-button click menu similar to the right-hand-button click menu 404 shown in FIG. 4(*a*) is displayed, by which the user may open a C component control screen as shown in FIG. 4(*c*) and a C component configuration screen as shown in FIG. 6. On the mixer configuration screen 500, the user is able to edit displayed components (addition of new component, deletion of existing component, change of arrangement, for example) and edit connections (addition of new connection, deletion of existing connection, and change of source or destination of connection, for example). For example, when "Component" menu is clicked with the mouse, a menu listing a plurality of components is displayed. When a desired component is selected from this list, the selected component is displayed on the mixer configuration screen 500, the displayed component being added to the CF data concerned. When a mouse drag operation is executed starting with a terminal of an arranged component and ending with a terminal of another component, a new connection is placed between these terminals. With the mouse cursor positioned at an existing component or connection, dragging the mouse start with that position as origin allows the movement of the position at which the existing component or connection is arranged.

A C component configuration screen 600 shown in FIG. 6 is an exemplary screen representative of a C component configuration (or the CC data read in the current memory of the PC) of the C component 504 shown in FIG. 5. As with the mixer configuration screen 500, the C component configuration screen 600 shows the P or C component of the C component concerned is displayed on the basis of the CAD data for PC in the CC data stored in the current memory and these components are interconnected with lines for specifying the input/output relationships of the components. Reference numerals 601 and 606 denotes elements indicative of the input and output terminals of this C component. Reference numerals 602 through 604 denote P or C components. These displayed P or C components are identified by the C data of the CAD data for PC in the CC data stored in the current memory and correspond to the PC data shown in FIG. 2(*a*) and the CC data shown in FIG. 2(*b*). When an instruction is given for the storage of the C component stored in the current memory under creation and editing on the C component configuration screen, the CC data representative of the configuration of the C component displayed at that moment may be stored in a given storage with the format described with reference to FIG. 2(*b*) and with the specified file name. Conversely, when the CC data having the format shown in FIG. 2(*b*) stored in a given storage is opened, that CC data is read into the current memory and the C component configuration screen corresponding to the that CC data is displayed as shown in FIG. 6 for the execution of editing.

The following describes the control screens shown in FIGS. 4(*b*) and 4(*c*). The creator of a mixer configuration (FIG. 5) and a C component (FIG. 6) may create the control screens for the created mixer configuration and C component. A P component has a preset control screen. For example, because the block 505 on the mixer configuration screen shown in FIG. 5 is a P component (4×4 mixer), giving an instruction "Open control screen" to that P component by executing right-hand-button click or double click opens the preset control screen. This preset screen has controls for setting and changing various parameter items of that P component and such display elements as meters and graphs for displaying parameter values at the current time. In creating mixer configuration and C component control screens, a window for control screen creation is opened by executing a predetermined operation and controls for example are dragged by operating the mouse from the control screen of the P component and component that are configuration elements of the mixer configuration concerned or the C component and dropped in the opened window, upon which these controls are copied and arranged into the opened window, for example. When any of the controls for example arranged in the window is dragged again, the position of that control may be changed. For example, a control screen 410 having a mixer configuration of the engine 2 shown in FIG. 4(*b*) is created by opening the control screen of one of the components displayed on the mixer configuration screen of the engine 2 shown in FIG. 5 and dragging and dropping a control 411 and a display element 412 from the opened control screen. Likewise, a control screen 420 of C component CC1 shown in FIG. 4(*c*) is created by opening the control screen of one of the components displayed on the C component configuration screen shown in FIG. 6 and dragging and dropping a meter 421, a control (or knob) 422, and a display element 423 from the opened control screen. It should be noted that the method of creating each control screen is not limited to that described here. The window arranged with desired controls for example is switched to the control screen of the mixer concerned or a C component by a predetermined switching operation. Each control shown on the created control screen functions in the same manner as each the P component from which that control has been copied or each copied control on the control screen of a C component. Namely, when that control is operated, the same parameter as the parameter that changes when the copied control in the current scene is operated changes in the same changing manner.

The mixer control program 131 has an edit mode (offline) and the execute mode (online) as operation modes. Switching between the edit mode and the execute mode may be effected by a predetermined operation. In the edit mode, CF data and CC data are created and edited. In the execute mode, the engine 100 is realtime controlled from the mixer control program 131 of the PC 130 in which current scene data is synchronized between the PC 130 and the engine 100. For example, if a component displayed on a mixer configuration screen has a fader or if the control screen of a component has a fader, an operation of this fader with the mouse in the execute mode is reflected realtime on the engine 100. In the execute mode, component configuration and connection cannot be changed. The execute mode is selectable only when the mixer configuration called into the current memory on the side of the PC 130 matches the mixer configuration called into the current memory on the side of the engine 100.

The following describes the use authority of each user in the mixer control program 131 of the present embodiment. In the above description made with reference to FIGS. 4 through 6, the authority for executing an edit operation by displaying necessary screens has not been explained. The mixer control program 131 of the present embodiment executes use authority control so as to protect vendor know-how. It should be noted that the following description applies to both the edit mode and the execute mode.

In the present embodiment, the user who creates and edits a mixer configuration and a C component by use of the mixer control program 131 is divided into a general user and a vendor user. A typical general user is an end user who uses a mixer concerned. In consideration of a case where a plurality of general users commonly use the mixer control program 131, the mixer control program 131 of the present embodiment is adapted to define the user authority of each general user. To be more specific, for the user authority of a general user, several account levels are provided; especially, general users having the account level of administrator authority are allowed to define the contents of each user authority.

On the other hand, a vendor user denotes a vendor that provides mixer configurations and C components to general users. For example, if the engine 100 is installed at a hall, a vendor may go to the hall to create and edit the CF data of a mixer configuration adapted to that hall by use of the PC 130 connected to the mixer and install the created and edited mixer configuration into the mixer or the CC data created and edited by that vendor. Sometimes, a general user may get the CF data or the CC data provided by a vendor and install the obtained CF data or CC data into the PC 130 by following a predetermined installation procedure. The CF data and the CC data, if provided by a vendor, are stored in a predetermined storage on the PC 130 with formats shown in FIGS. 2(*b*) and 2(*c*) along with preset data or data created by the general user.

Now, vendor users want to apply use restriction to the data provided by them on various levels, data by data, so as to protect the copyright of the data. To achieve this object, the mixer control program 131 according to the present embodiment is adapted to set vendor account in addition to user account for specifying general users. The vendor account is made transparent to general users. To be more specific, a dongle (or a hardware key) in which authentication information for authenticating a specific vendor) is distributed to each vendor user. The dongle is plugged in a predetermined port (for example, a USB port or a serial port) of the PC 130. When the dongle is connected to the PC 130, the mixer control program 131 recognizes that the user is a vendor user and executes a logon sequence for vendor user. Consequently, the mixer control program 131 grants that user with a vendor authority. The dongle is not distributed to general users.

Figure 7A:
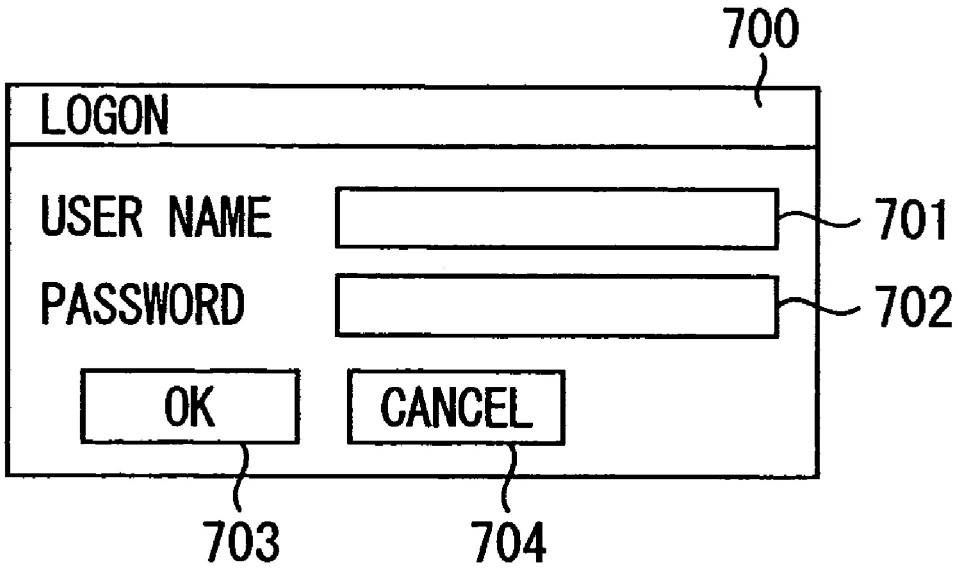
FIGS. 7(*a*) and 7(*b*) are diagrams illustrating examples of logon screens.
Figure 7B:
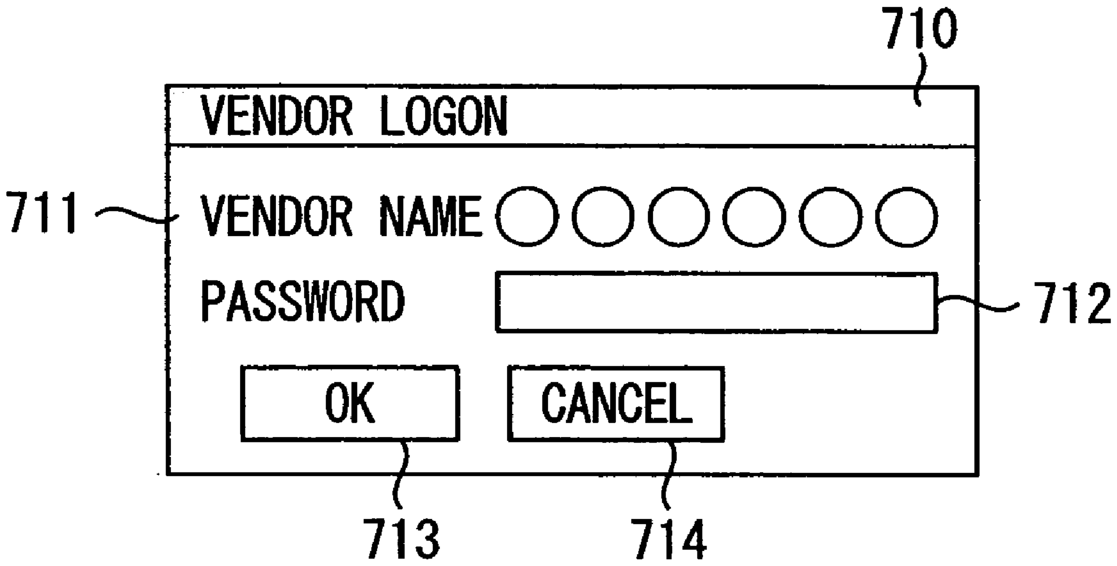

FIGS. 7(*a*) and 7(*b*) show logon screens that are first displayed when the mixer control program 131 is started up. FIG. 7(*a*) shows a logon screen 700 for general users to be displayed when the dongle is not plugged in a predetermined port. Reference numeral 701 denotes a user name input area, reference numeral 702 denotes a password input area, reference numeral 703 denotes an OK button, and reference numeral 704 denotes a cancel button. When a general user enters his user name and password into the areas 201 and 202 respectively and presses the OK button 703, the basic screen 400 shown in FIG. 4 appears. On the other hand, FIG. 7(*b*) shows a logon screen 710 for a vendor user to be displayed when the dongle is plugged in a predetermined port. Reference numeral 711 denotes a vendor name. Because the dongle stores the vendor name (or the vendor ID), the vendor name is read from the dongle to be displayed. Reference numeral 712 denotes a password input area, reference numeral 713 denotes an OK button, and reference numeral 714 denotes a cancel button. When a vendor user enters his password in the area 712 and pressed the OK button 713, the basic screen 400 shown in FIG. 4 appears.

The vendor user who has logged on by vendor authority is able to execute edit processing on any mixer configuration, C component, and parameter data that are vendor-protected by himself, without limitation. A general user who has logged on without the dongle is permitted to execute operations in accordance with the granted user authority. However, if a logon is made with the top administrator authority of the general user authorities, the mixer configurations protected by a vendor users against general users may sometimes be restricted in reference and editing for example in accordance the contents of the applied vendor protection.

Figure 8A:
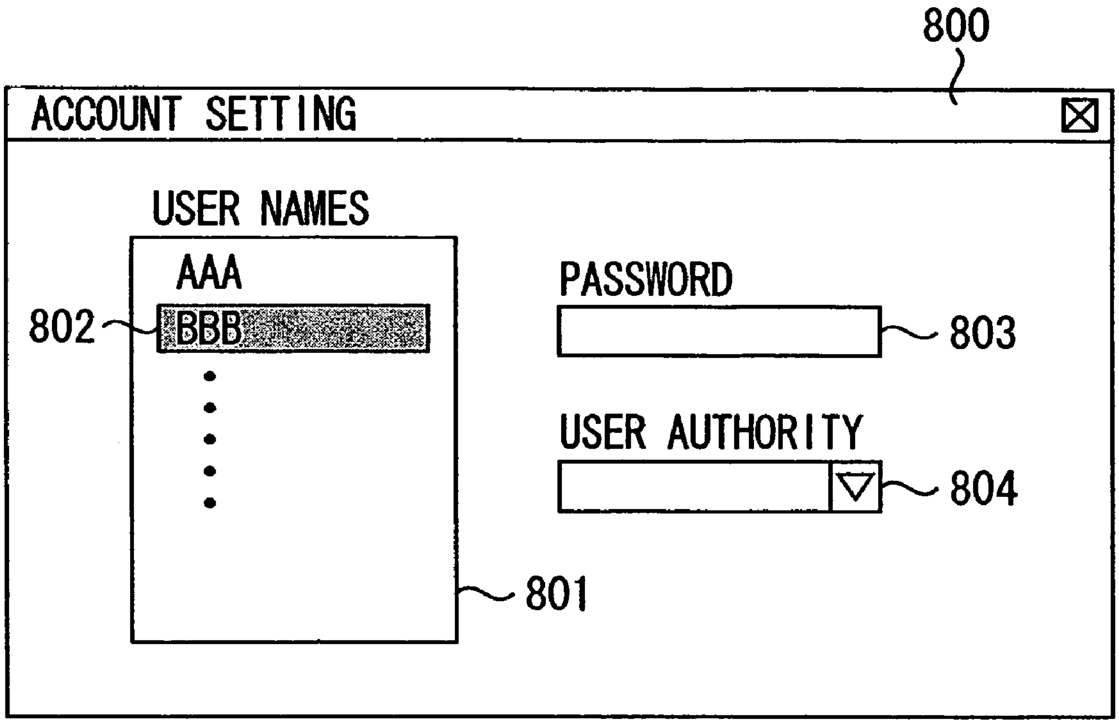
FIGS. 8(*a*) and 8(*b*) are diagrams illustrating examples of account setting windows.
Figure 8B:
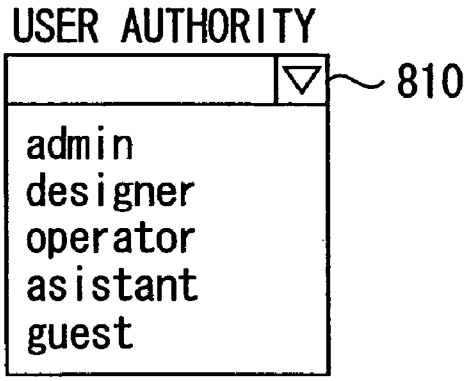

FIG. 8(*a*) shows an account setting window 800 that is displayed by the mixer control program 131. The account setting window 800 is displayed when a general user who has logged on with administrator authority selects a predetermined menu from the basic screen shown in FIG. 4. The account setting window 800 has a user name select area 801, a password input area 803, and a user authority select area 804. The user name select area 801 shows the user names of all registered users (namely, general users) who use the mixer control program 131. When a cursor 802 is positioned at a desired user name in the user name select area 801, the password and the user authority current set to the selected user name are displayed in the areas 803 and 804 respectively. The password displayed in the password input area 803 may be changed as desired. When the down arrow at the right end is pressed in the user authority select area 804, a list 801 shown in FIG. 8(*b*) appears, in which a user authority may be selected. "admin" denotes the top administrator authority.

Figure 9A:
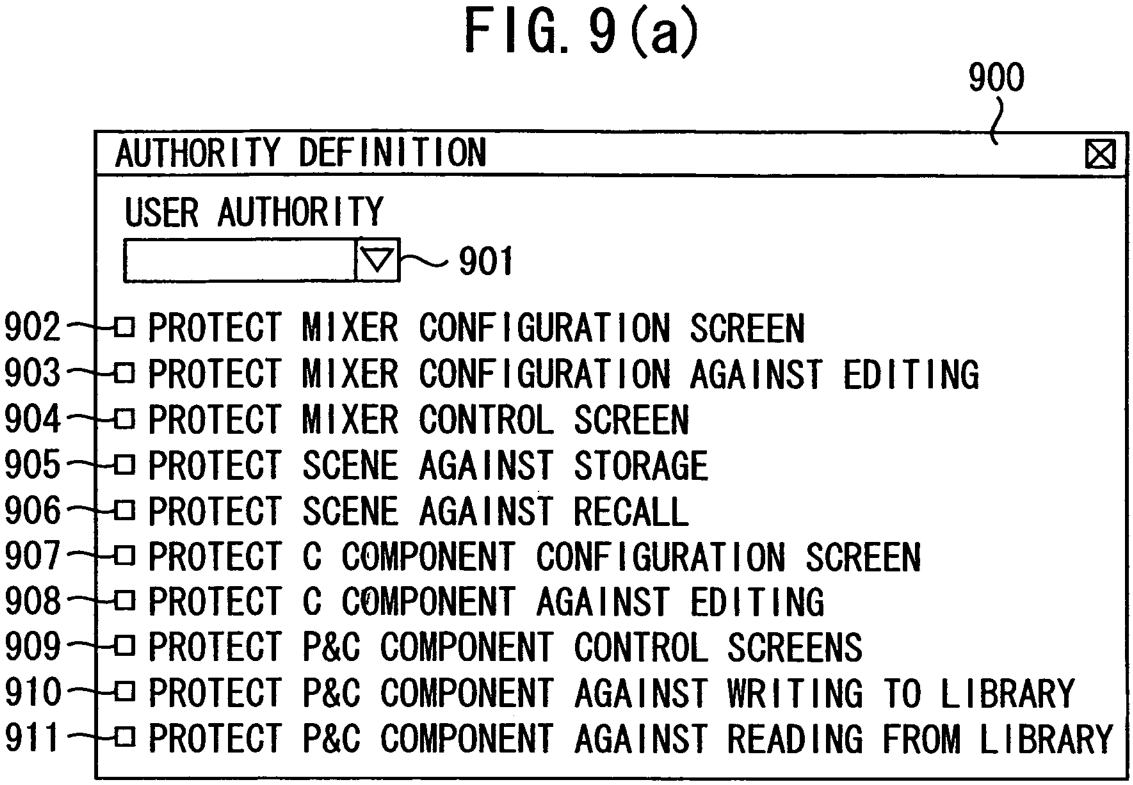
FIGS. 9(*a*) and 9(*b*) are diagrams illustrating examples of authority definition windows.
Figure 9B:
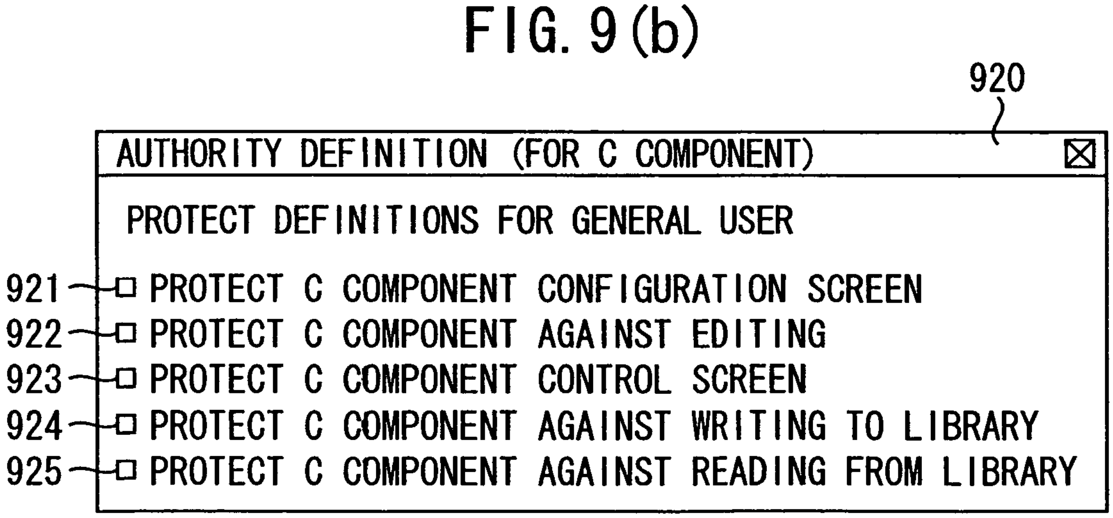

FIG. 9(*a*) shows an example of an authority definition window 900. Like the account setting window 800, the authority definition window 900 is displayed when a general user who has logged on with administrator authority selects item "User authority definition" from "Tool" menu on the basic screen shown in FIG. 4(*a*). Alternatively, the authority definition window 900 may be adapted to open when a predetermined button arranged in the account setting window 800 is clicked. A user authority select area 901 is a list box for selecting user authorities shown in FIG. 8(*b*). A user authority is selected in the user authority select area 901 and details of the protection of the selected user authority are set in check boxes 902 through 911. The check box denotes that checking a particular check box protects the item thereof against the user having that user authority (namely, the use of that item is restricted) and that unchecking clears the protection.

Reference numeral 902 denotes a check box for specifying whether to permit the displaying of the mixer configuration screen as shown in FIG. 5. The user having the user authority with the check box 902 checked cannot open the mixer configuration screen if the user selects "Open configuration screen" in the basic screen 400 shown in FIG. 4(*a*). Namely, that user may make the confirmation of the configuration of the mixer engine in the basic screen 400 but is disabled to know the contents of the processing being executed in each mixer engine. In this case, the selection may be disabled by displaying the menu options in gray from the beginning or the selection may be made but displaying of the mixer configuration screen may be disabled by displaying an error message for example (the same holds with each of the following check boxes). Reference numeral 903 denotes a check box for specifying whether to permit mixer configuration editing on the mixer configuration screen as shown in FIG. 5. Reference numeral 904 denotes a check box for specifying whether to permit the opening of the mixer control screen as shown in FIG. 4(*b*). Reference numeral 905 is a check box for specifying whether to permit the storing of scene data. Reference numeral 906 denotes a check box for specifying whether to permit the recall of scene data. The storing here denotes storing scene data into a storage as scene data having a specified scene number. The recall here denotes reading, as the current scene, the scene data having a specified scene number among a plurality of pieces of scene data stored in the storage. Reference numeral 907 denotes a check box for specifying whether to permit the displaying of the C component configuration screen as shown in FIG. 6. Reference numeral 908 denotes a check box for specifying whether to permit the editing of a C component displayed by checking the check box 907. Reference numeral 909 denotes a check box for specifying whether to permit the displaying of the control screen of components (including both P and C). Reference numeral 910 is a check box for specifying whether to permit the writing of a components into its library. Reference numeral 911 denotes a check fox for specifying whether to permit the reading of a component from the library.

On the other hand, each vendor user is able to define the contents of vendor protection to be commonly applied to general users (including all user authorities shown in FIG. 8(*b*)) for the created mixer configurations, C components, and parameters. The vendor protection contents are stored in the CF header of CF data shown in FIG. 2(*c*) in the case of a mixer configuration and in the CC header of the CC data shown in FIG. 2(*b*) in the case of a C component, along with the vendor ID of that vendor. The contents of parameter data depend on the library of C components and the scene data of CF data. In order to vendor-protect the library data of C components, the vendor protection contents are stored in the CC header of the CC data in which the library data is stored. In order to vendor-protect the scene data of CF data, the vendor protection contents are stored in the CF header of the CF data in which the scene data is stored.

The setting of these vendor protection contents may be made in any manner. For example, a capability of setting vendor protection contents may be imparted to the mixer control program 131. To be more specific, a vendor user who has logged on the mixer control program 131 with vendor authority opens an authority definition window in which to set vendor protection contents to the created mixer configurations, C components, and parameters, thereby setting the vendor protection contents. This authority definition window may be opened only by the vendor user who has logged on with vendor authority, but not by a general user.

FIG. 9(*b*) shows an example of an authority definition window for setting the above-mentioned vendor protection contents; especially, an example of an authority definition window 920 for setting the vendor protection contents to the C component and its parameters created by the vendor by use of the C component configuration screen as shown in FIG. 6. This screen is displayed when the vendor user selects item "Authority definition by vendor" from "Tool" menu of the screen shown in FIG. 6, for example. Through the authority definition screen 920, the vendor user defines the authority of that C component of a general user. Reference numeral 921 denotes a check box for specifying whether to permit the displaying of the C component configuration screen as shown in FIG. 6. If the displaying of the C component configuration screen is not permitted, general users are unable to edit the CAD data for PC of that C component. Reference numeral 922 denotes a check box for specifying whether to permit the editing of a C component on the C component configuration screen as shown in FIG. 6. Reference numeral 923 denotes a check box for specifying whether to permit the opening of the C component control screen as shown in FIG. 4(*c*). Reference numeral 924 denotes a check box for specifying whether to permit the writing of a C component into its library. Reference numeral 925 denotes a check box for specifying whether to permit the reading of a C component from the library. In the vendor protection, the displaying of the C component configuration screen is not normally permitted to protect the know-how of signal processing configurations. In this case, the individual adjustment of parameter data is permitted only on the C component control screen. Therefore, if the displaying of the control screen is disabled, general users become disabled to individually adjust parameter data. If a vendor creates parameters and stores the created parameters in a library for delivery, the parameters stored in the library may be protected against alteration; in the vendor protection mode, only the reading of parameters from the library is permitted and the writing thereto is not permitted. The vendor protection contents thus defined by the vendor user on the authority definition screen 920 are stored in the CC header of the CC data shown in FIG. 2(*b*) along with the vendor ID.

In the above, an example in which the vendor protection contents of a C component has been described. The same holds with the setting of the vendor protection contents of the CF data and the parameter data thereof created on the mixer configuration screen 500 shown in FIG. 5, in which an authority setting screen similar to that shown in FIG. 9(*b*) is used. However, because the scene memory of CF data is equivalent to the library of C components, the write and read protections are set to not the library but the scene memory on this similar screen. Also, this similar screen may be displayed when item "Define authority by vendor" is selected from "Tool" menu of the screen shown in FIG. 4, for example. In the above-mentioned example, the mixer control program 131 has the capability of setting vendor protection contents. Alternatively, another program may set vendor protection contents to the already created mixer configurations, C components, and parameters. Such a program is available only for vendor users and has the capabilities described with reference to FIG. 9(*b*).

Figure 10:
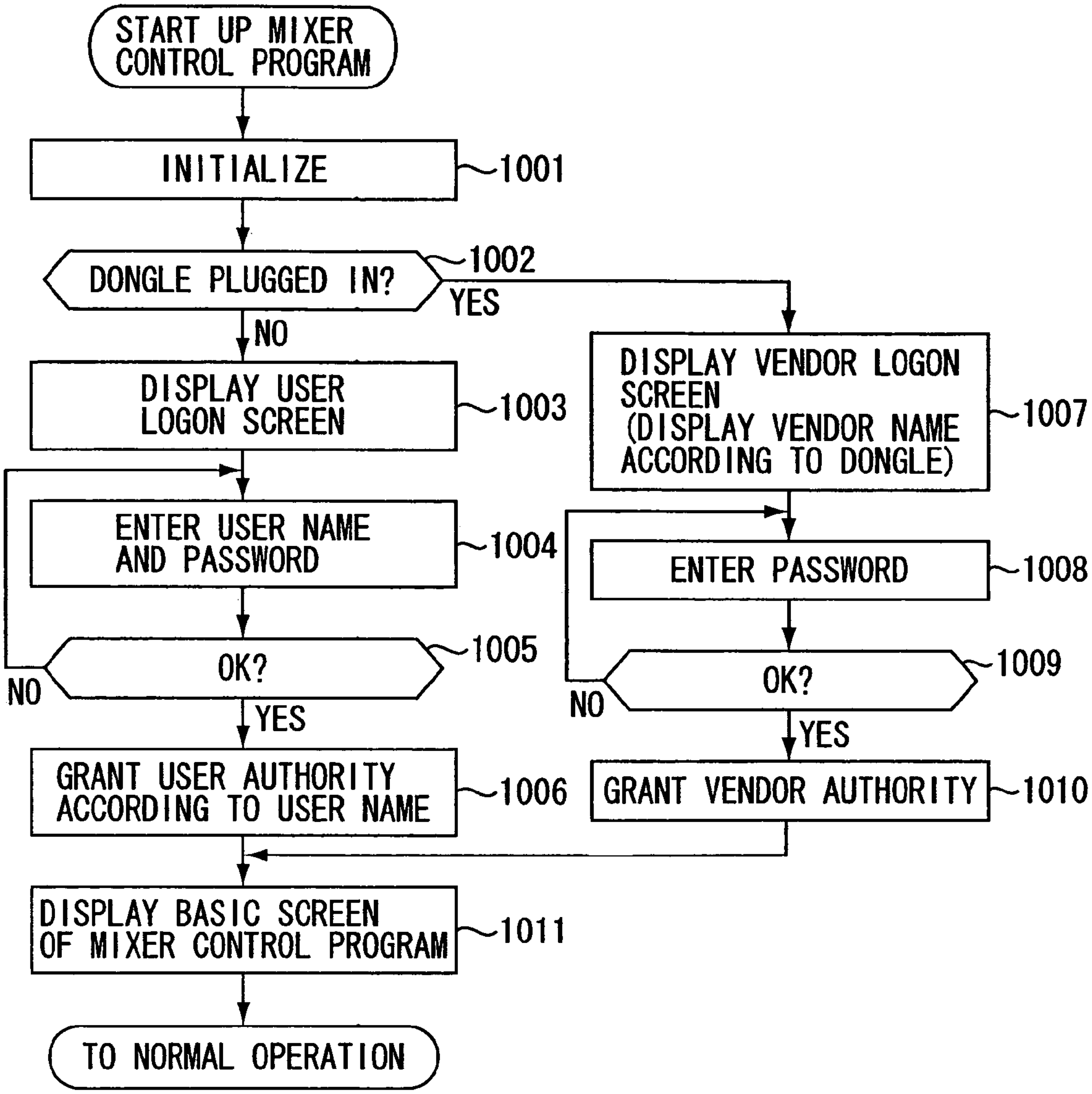
FIG. 10 is a flowchart indicative of a processing procedure to be followed when the mixer control program is started up.

FIG. 10 shows a processing procedure to be followed when the mixer control program 131 is started up. In step 1001, the initial setting is executed. In step 1002, it is determined whether a dongle is plugged in a predetermined port. If the dongle is found not plugged in a predetermined port, then the logon screen 700 for general users shown in FIG. 7(*a*) is displayed in step 1003. In step 1004, the user name and the password are entered and the OK button is pressed. In step 1005, it is determined whether the entered user name and password are correct. If the entered user name and password are found correct, then a user authority (set in the screen shown in FIG. 8(*a*)) is granted to that user name in step 1006. In step 1011, the basic screen 400 shown in FIG. 4(*a*) is displayed, upon which the system enters the normal operation mode. If the dongle is found plugged in a predetermined port, then the vendor logon screen 710 shown in FIG. 7(*b*) is displayed in step 1007. When the password is entered in step 1008, it is determined whether the entered password is correct in step 1009. If the password is found correct, then the vendor authority is granted in step 1010, upon which the procedure goes to step 1011. Thus, the vendor authority is granted to the vendor who has properly logged on by plugging the dongle in a predetermined port. To a general user who has entered the proper user name and password without the dongle, a user authority in accordance with the user name is granted.

Figure 11:
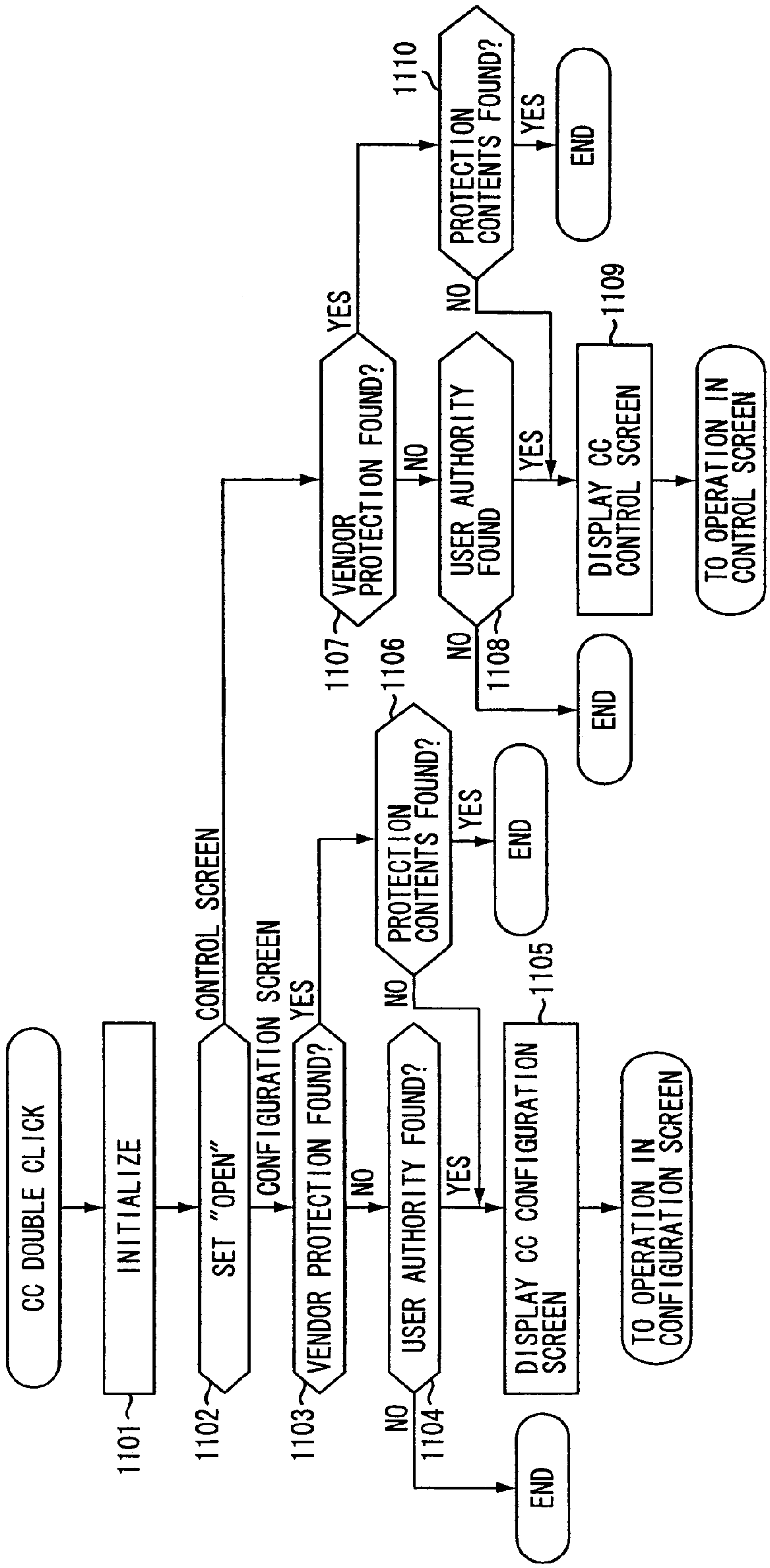
FIG. 11 is a flowchart indicative of a processing procedure to be followed when a C component shown on the mixer configuration screen is double-clicked.

FIG. 11 shows a processing procedure that is followed when the user double-clicks a C component shown in the mixer configuration screen 500 shown in FIG. 5. In step 1101, the initial setting is executed. In step 1102, the property is checked which of the control screen and the configuration screen is to be opened by double click. If the configuration screen is to be opened, then the CC header of the CC data of that C component is referenced to check for the vendor ID and the vendor protection contents in step 1103. If no vendor protection is found (namely, if there is no vendor provided data), then the user authority is checked in step 1104. This check is made to determined whether the opening of the configuration screen of that C component is permitted with the user authority of the user currently logging on (if the logon user is a general user, the determination is made on the basis of the setting shown in FIG. 9(*a*) and the vendor user is regarded as having general user's administrator authority). If no user authority is found, then the processing ends. If a user authority is found, then the procedure goes to step 1105, in which the configuration screen of that C component (shown in FIG. 6 for example) is displayed and the procedure goes to an operation on the screen.

If that C component is found to be the data having vendor protection in step 1103, then the vendor protection contents are checked in step 1106. In step 1106, the following processing operations (1) and (2) are executed, to be specific.

(1) If the logon user is a vendor user, the vendor user ID stored in the dongle is compared with the vendor ID set to the CC header of that C component.

(1-1) If a match is found, it indicates that the C component is the data provided by the current logon vendor user, so that the procedure goes from step 1106 to step 1105.

(1-2) If a mismatch is found, it indicates that the component is the data created by another vendor, so that it is determined whether the protection of the C component configuration screen is set on the basis of the vendor protection contents (set with the check box 921 shown in FIG. 9(*b*)) set to the CC header of that C component. If the protection is found not set, the procedure goes from step 1106 to step 1105; if the protection is found set, the processing ends from step 1106.

(2) If the logon user is a general user, it is determined whether the protection of the C component configuration screen is set on the basis of the vendor protection contents (set with check box 921 shown in FIG. 9(*b*)) set to the CC header of that C component. If the protection is found not set, the procedure goes from step 1106 to step 1105; if the protection is found set, the processing ends from step 1106.

To open the control screen in step 1102, the procedure goes to step 1107. The processing operations of steps 1107 through 1110 are substantially the same as those of steps 1103 through 1106 except that the screen to be displayed is the C component control screen (the vendor protection is that set with check box 923 shown in FIG. 9(*b*)).

With reference to FIG. 11, the vendor protection control in the processing of opening the C component configuration screen or control screen has been described. The same holds with the vendor protection control to be executed when an operation associated with other protection contents is executed. It should be noted that, with reference to FIG. 11, the procedure directly goes to steps 1105 and 1109 if the displaying of the CC configuration screen and the CC control screen is permitted after the checking of the vendor protection contents in step 1106 and 1110; alternatively, the procedure may go to step 1104 and 1108. If the procedure goes to step 1104 and 1108, the protection in which there is no general user authority although permitted by the control of vendor protection may be realized. For example, if the protection of the control screen is set by the user authority of the current logon general user although the displaying of the control screen for general users is permitted by the vendor protection contents, the processing may be ended directly from step 1108, thereby preventing the control screen from being displayed.

Figure 12:
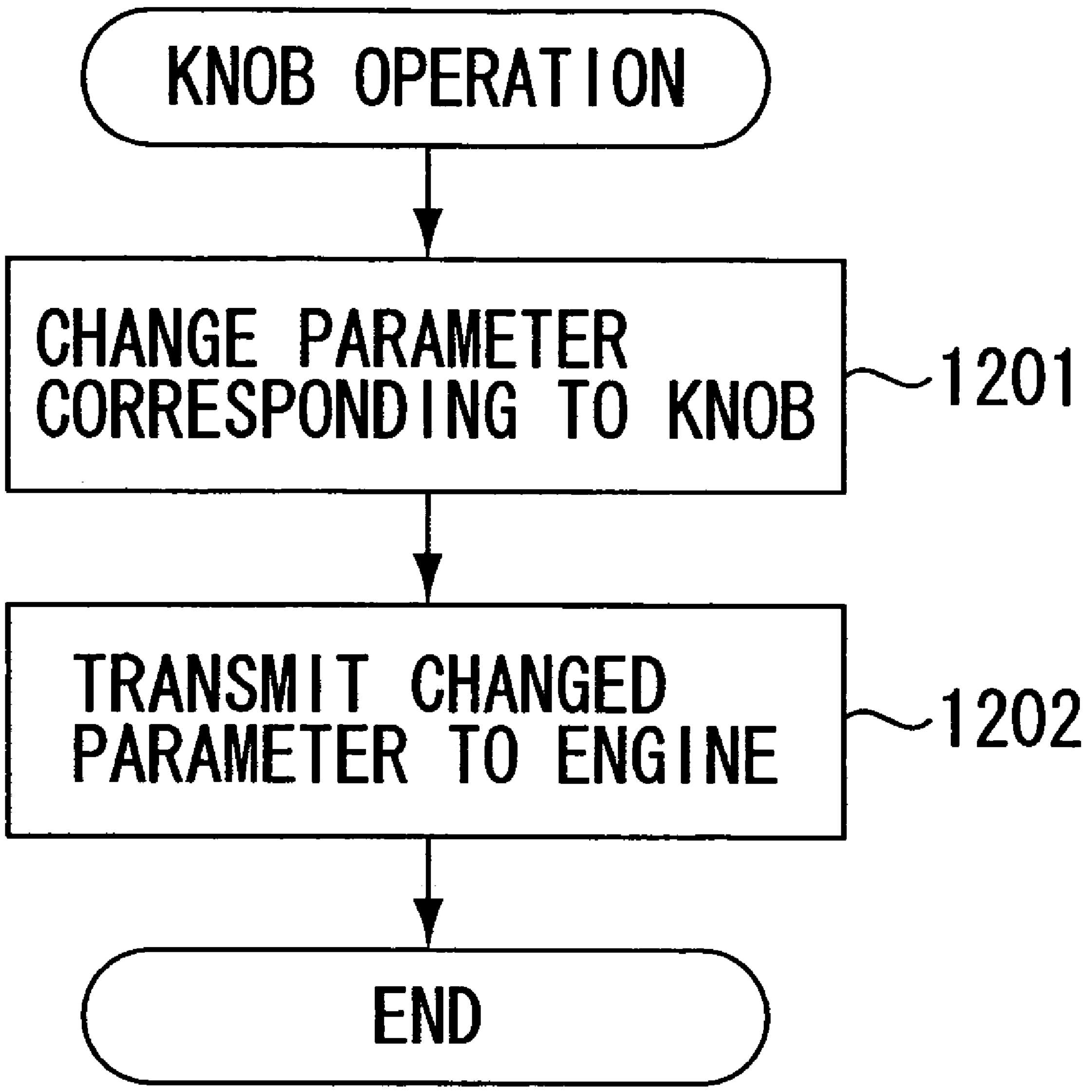
FIG. 12 is a flowchart indicative of a processing procedure of a knob operation.

FIG. 12 shows a processing procedure a knob operation on various screens (having knobs) in the execute mode. In step 1201, a parameter (in the current memory in the PC) corresponding to a knob is changed. In step 1202, the changed parameter is transmitted to the engine 100. On the side of the engine 100, the received parameter is written to the current scene described with reference to FIG. 3(*b*) to be transmitted to the signal processing block 110.

When a vendor user provides a mixer configuration (CF data) and a C component (CC data) to general users, is it considered that protection is often set to the configuration screen and editing capabilities because the provided configuration and parameter setting are often transparent to general users. On the other hand, as for the parameters that may be freed to general users with respect to mixer configurations and C components, it is necessary to provide step of general users to execute parameter setting. Therefore, in many cases, vendor users create a control screen having only controls of parameters made available to general users and clear the control screen of protection before providing to general users. Consequently, by operating controls such as knob controls on the control screen in the execute mode as shown in FIG. 12, general users may realtime control the parameters to be given to the engine 100.

In the above-mentioned embodiment, a dongle, but not exclusively, is used. Instead of a dongle, any means may be usable as long as it is able to discriminate vendor users from general users. For example, a subroutine for controlling the logon screen of the mixer control program 131 is customized for each vendor and the customized subroutine is provided thereto. The customized program allows the displaying of the vendor logon screen shown in FIG. 7(*b*). With an uncustomized program, only the general user logon screen shown in FIG. 7(*a*) may be displayed. Alternatively, the vendor logon may be enabled by biometrics such as retinal or fingerprint scanning. In the above-mentioned embodiment, the data provided by vendors is protected by vendor protection. It is also practicable for the present invention to be provide enabling/disabling of any other capabilities. With reference to FIG. 11, the protection contents are checked after an instruction for "Open" is given to the target C component to be subject to processing; alternatively, in the case of a user interface in which options subject to processing are displayed and one of the options is selected, the protection contents may be checked at the displaying of options without displaying options having no authority.

In the above-mentioned embodiment, an example has been described in which the vendor ID and the vendor protection contents are set in the data supplied by vendors. Alternatively, only the vendor ID is set and, if the vendor ID is set in the target data to be processed by general users, "Use is uniformly prohibited" or "Only the control screen is permitted for use but the displaying and editing of the configuration screen are prohibited" may be indicated, for example.

As described above, if the provided data is a mixer configuration, general users may load the data to make the mixer engine execute it. Within a scope permitted by the vendor of the data, general users may open the control screen of the provided mixer configuration to edit operation data and recall or save scene data. If the provided data is a customized component, general users may use this customized component when creating a mixer configuration and make the mixer engine execute the mixer configuration including the created customized component. Then, within a scope permitted by the vendor, general users may open the control screen of the customized component to edit operation data and recall or save the library.

Vendors may sell data with the know-how of the structures of mixer configuration and customized component made transparent to general users or sell the entirety of the control data of mixer configuration and customized component made transparent to general users.

It should be noted that, in the above-mentioned embodiment, the basis screen on the top layer (FIG. 4(*a*)) may be opened regardless of protection. The CAD data of CF data and CC data is encrypted, so that the analysis of the CAD data by a program other than the control program concerned will not disclose the corresponding mixer configuration.

The system of the above-mentioned embodiment is intended to protect know-how, so that, even if CF data and CC data are vendor-protected, general users are allowed the basic use of the system. Namely, (1) in the case of CF data, regardless of vendor protection, general users may load the vendor-protected CAD data into the current memory of the PC 130 and make the engine 100 execute the CAD data online; (2) in the case of CC data, regardless of vendor protection, general users, when editing the CAD data for PC of the CF data on the mixer configuration screen shown in FIG. 5, may use the C component corresponding to the CC data and make the mixer engine execute the CF data including the created C component.

What is claimed is:

1. A machine readable medium containing a mixer engine control program executable by a computer for performing a method of displaying and editing a mixer configuration which specifies a mixing process of a signal processing apparatus, wherein the method comprises the steps of:

logging on the mixer engine control program with one of a plurality of user authorities in accordance with an operation done by an operator;

reading one of a plurality of mixer configurations from a storage;

displaying or editing the read mixer configuration within a scope permitted by the user authority with which the mixer engine control program has been logged on; and writing the edited mixer configuration to the storage; wherein the storage may store a protected mixer configuration created and supplied by a vendor, such that the mixer configuration created by the vendor is protected with a vendor authority higher than the plurality of the user authorities with which the user is able to log on the mixer engine control program, and wherein when the mixer configuration protected with the vendor authority is supplied, the supplied mixer configuration is protected against displaying and editing of the mixer configuration in the step of displaying or editing if the mixer engine control program has been logged on with any one of the plurality of user authorities.

2. The machine readable medium according to claim 1, wherein the mixer engine control program is executable by the computer to perform displaying and editing of parameters used in the mixer configuration in addition to or instead of displaying and editing of the mixer configuration.

3. A machine readable medium containing a mixer engine control program executable by a computer for performing a method of displaying and editing a custom component of a mixer configuration which specifies a mixing process of a signal processing apparatus, the custom component being created by a combination of a plurality of components, wherein the method comprises the steps of:

logging on an editing application of the mixer engine control program with one of a plurality of user authorities in accordance with an operation done by an operator;

reading one of a plurality of custom components stored in a storage;

displaying or editing the read custom component within a scope permitted by the user authority with which the editing application has been logged on; and writing the edited custom component to the storage, wherein the storage may store a protected custom component which is created and supplied by a vendor such that the custom component created by the vendor is protected with a vendor authority higher than the plurality of the user authorities with which the user is able to log on the editing application of the mixer engine control program, and wherein when the custom component protected with the vendor authority is supplied, the supplied custom component is protected against displaying and editing of the custom component in the step of displaying or editing if the editing application has been logged on with any one of the plurality of the user authorities.

4. The machine readable medium according to claim 3, wherein the mixer engine control program is executable by the computer to perform displaying and editing of parameters used in the custom component of the mixer configuration or.

5. A machine readable medium containing a mixer engine control program executable by a computer to perform a method of displaying and editing a mixer configuration or a custom component thereof for specifying a mixing process of a signal processing apparatus, wherein the method comprises:

an acceptance step of discriminating whether a logon user is a vendor user or a general user and accepting a logon of the mixer engine control program with one of a plurality of user authorities in case that a logon user is a general user;

a determination step of determining whether a vendor identification code is set to a target mixer configuration or a target custom component thereof, which is stored in a storage and which is to be treated by the mixer engine control program;

another determination step of determining whether the logon user of the mixer engine control program is a vendor user or a general user;

a permission step of determining, if the vendor identification code is set in the target mixer configuration or the target custom component thereof and the logon user is the vendor user, whether a vendor identification code of the logon user matches the vendor identification code set in the target mixer configuration or the target custom component thereof, and if a match is found, permitting the logon user to display and edit the target mixer configuration or the target custom component thereof; and an prohibition step of not permitting, if the vendor identification code is set in the target mixer configuration or the target custom component thereof and the logon user is a general user, the logon user to display and edit the target mixer configuration or the target custom component thereof, or partially permitting the logon user to display and edit the target mixer configuration or the target custom component thereof only within a limited scope.

6. The machine readable medium according to claim 5, wherein the acceptance step determines whether a dongle storing a vendor identification code and vendor authentication information is plugged in a predetermined port of the computer, thereby discriminating whether a logon user is a vendor user or a general user.

7. The machine readable medium according to claim 5, wherein the mixer engine control program is executable by the computer to perform displaying and editing of parameters used in the mixer configuration or the custom component thereof in addition to or instead of displaying and editing of the mixer configuration or the custom component thereof.

8. A machine readable medium containing a mixer engine control program executable by a computer to perform a method of displaying and editing a mixer configuration or a custom component thereof for specifying a mixing process of a signal processing apparatus, wherein the method comprises:

an acceptance step of discriminating whether a logon user is a vendor user or a general user and accepting a logon of the mixer engine control program with one of a plurality of user authorities in case that a logon user is a general user;

a determination step of determining whether a vendor identification code and a vendor protection content are set to a target mixer configuration or a target custom component thereof, which is stored in a storage and which is to be treated by the mixer engine control program, the vendor protection content indicating limitations applied to a general user who uses the target mixer configuration or the target custom component thereof;

another determination step of determining whether the logon user of the mixer engine control program is a vendor user or a general user;

a permission step of determining, if the vendor identification code and the vendor protection content are set in the target mixer configuration or the target custom component thereof and the logon user is the vendor user, whether a vendor identification code of the logon user matches the vendor identification code set in the target mixer configuration or the target custom component thereof, and if a match is found, permitting the logon user to display and edit the target mixer configuration or the target custom component thereof; and another permission step of permitting, if the vendor identification code and the vendor protection content are set in the target mixer configuration or the target custom component thereof and the logon user is a general user, the logon user to display and edit the target mixer configuration or the target custom component thereof within a limited scope indicated by the vendor protection content.

9. The machine readable medium according to claim 8, wherein said another permission step permits the general user as the logon user to display and edit the target mixer configuration or the target custom configuration thereof within a limited scope determined by both of the user authority of the general user and the vendor protection content.

10. The machine readable medium according to claim 8, wherein the mixer engine control program includes a program executed by the computer for realizing a capability of setting the vendor protection content in the target mixer configuration or the target custom component thereof stored in the storage.

11. The machine readable medium according to claim 8, wherein the acceptance step determines whether a dongle storing a vendor identification code and vendor authentication information is plugged in a predetermined port of the computer, thereby discriminating whether a logon user is a vendor user or a general user.

12. The machine readable medium according to claim 8, wherein the mixer engine control program is executable by the computer to perform displaying and editing of parameters used in the mixer configuration or the custom component thereof in addition to or instead of displaying and editing of the mixer configuration or the custom component thereof.

13. A method of displaying and editing a mixer configuration which specifies a mixing process of a signal processing apparatus, by means of a mixer engine control program executable by a computer, the method comprising the steps of:

logging on the mixer engine control program with one of a plurality of user authorities in accordance with an operation done by an operator;

reading one of a plurality of mixer configurations from a storage;

displaying or editing the read mixer configuration within a scope permitted by the user authority with which the mixer engine control program has been logged on; and writing the edited mixer configuration to the storage; wherein the storage may store a protected mixer configuration created and supplied by a vendor, such that the mixer configuration created by the vendor is protected with a vendor authority higher than the plurality of the user authorities with which the user is able to log on the mixer engine control program, and wherein when the mixer configuration protected with the vendor authority is supplied, the supplied mixer configuration is protected against displaying and editing of the mixer configuration in the step of displaying or editing if the mixer engine control program has been logged on with any one of the plurality of user authorities.

14. A method of displaying and editing a custom component of a mixer configuration which specifies a mixing process of a signal processing apparatus, by means of a mixer engine control program executable by a computer, the custom component being created by a combination of a plurality of components, the method comprising the steps of:

logging on an editing application of the mixer engine control program with one of a plurality of user authorities in accordance with an operation done by an operator;

reading one of a plurality of custom components stored in a storage;

displaying or editing the read custom component within a scope permitted by the user authority with which the editing application has been logged on; and writing the edited custom component to the storage., wherein the storage may store a protected custom component which is created and supplied by a vendor such that the custom component created by the vendor is protected with a vendor authority higher than the plurality of the user authorities with which the user is able to log on the editing application of the mixer engine control program, and wherein when the custom component protected with the vendor authority is supplied, the supplied custom component is protected against displaying and editing of the custom component in the step of displaying or editing if the editing application has been logged on with any one of the plurality of the user authorities.

15. A method of displaying and editing a mixer configuration or a custom component thereof for specifying a mixing process of a signal processing apparatus, by means of a mixer engine control program executable by a computer, the method comprising:

an acceptance step of discriminating whether a logon user is a vendor user or a general user and accepting a logon of the mixer engine control program with one of a plurality of user authorities in case that a logon user is a general user;

a determination step of determining whether a vendor identification code is set to a target mixer configuration or a target custom component thereof, which is stored in a storage and which is to be treated by the mixer engine control program;

another determination step of determining whether the logon user of the mixer engine control program is a vendor user or a general user;

a permission step of determining, if the vendor identification code is set in the target mixer configuration or the target custom component thereof and the logon user is the vendor user, whether a vendor identification code of the logon user matches the vendor identification code set in the target mixer configuration or the target custom component thereof, and if a match is found, permitting the logon user to display and edit the target mixer configuration or the target custom component thereof; and an prohibition step of not permitting, if the vendor identification code is set in the target mixer configuration or the target custom component thereof and the logon user is a general user, the logon user to display and edit the target mixer configuration or the target custom component thereof, or partially permitting the logon user to display and edit the target mixer configuration or the target custom component thereof only within a limited scope.

16. A method of displaying and editing a mixer configuration or a custom component thereof for specifying a mixing process of a signal processing apparatus, by means of a mixer engine control program executable by a computer, the method comprising:

an acceptance step of discriminating whether a logon user is a vendor user or a general user and accepting a logon of the mixer engine control program with one of a plurality of user authorities in case that a logon user is a general user;

a determination step of determining whether a vendor identification code and a vendor protection content are set to a target mixer configuration or a target custom component thereof, which is stored in a storage and which is to be treated by the mixer engine control program, the vendor protection content indicating limitations applied to a general user who uses the target mixer configuration or the target custom component thereof;

another determination step of determining whether the logon user of the mixer engine control program is a vendor user or a general user;

a permission step of determining, if the vendor identification code and the vendor protection content are set in the target mixer configuration or the target custom component thereof and the logon user is the vendor user, whether a vendor identification code of the logon user matches the vendor identification code set in the target mixer configuration or the target custom component thereof, and if a match is found, permitting the logon user to display and edit the target mixer configuration or the target custom component thereof; and another permission step of permitting, if the vendor identification code and the vendor protection content are set in the target mixer configuration or the target custom component thereof and the logon user is a general user, the logon user to display and edit the target mixer configuration or the target custom component thereof within a limited scope indicated by the vendor protection content.

* * * * *